(12) United States Patent
Liu et al.

(10) Patent No.: US 12,048,042 B2
(45) Date of Patent: Jul. 23, 2024

(54) RECONFIGURATION METHOD, TERMINAL DEVICE, AND COMMUNICATIONS SYSTEM

(71) Applicant: HUAWEI TECHNOLOGIES CO., LTD., Shenzhen (CN)

(72) Inventors: Yazhou Liu, Xi'an (CN); Hongyue Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 375 days.

(21) Appl. No.: 17/598,607

(22) PCT Filed: Mar. 29, 2019

(86) PCT No.: PCT/CN2019/080628
§ 371 (c)(1),
(2) Date: Sep. 27, 2021

(87) PCT Pub. No.: WO2020/199017
PCT Pub. Date: Oct. 8, 2020

(65) Prior Publication Data
US 2022/0159770 A1 May 19, 2022

(51) Int. Cl.
*H04W 76/19* (2018.01)
*H04W 60/04* (2009.01)
(Continued)

(52) U.S. Cl.
CPC ......... *H04W 76/19* (2018.02); *H04W 60/04* (2013.01); *H04W 60/06* (2013.01); *H04W 76/20* (2018.02)

(58) Field of Classification Search
CPC ..... H04W 76/19; H04W 76/20; H04W 60/04; H04W 60/06; H04W 8/245; H04L 5/001; H04L 5/0098; H04L 5/0091
See application file for complete search history.

(56) References Cited

U.S. PATENT DOCUMENTS

2012/0314566 A1   12/2012   Lee et al.
2015/0249991 A1   9/2015    Rousu et al.
(Continued)

FOREIGN PATENT DOCUMENTS

CN   102026404 A   4/2011
CN   102595597 A   7/2012
(Continued)

OTHER PUBLICATIONS

Chinese Office Action issued in corresponding Chinese Application No. 201980092480.X, dated Jan. 20, 2022, pp. 1-14.
(Continued)

*Primary Examiner* — Mandish K Randhawa
(74) *Attorney, Agent, or Firm* — HAUPTMAN HAM, LLP

(57) ABSTRACT

Embodiments of this application provide a reconfiguration method, a terminal device, and a communications system. The method includes: A terminal device sends a first capability report message when requesting to attach to a first cell. When a reconfiguration request message is received for N consecutive times and all reconfigurations fail, the terminal device detaches from the first cell, where the reconfiguration request message is used to indicate, to the terminal device, a frequency of a secondary cell in which carrier aggregation is performed, and N is a positive integer. The terminal device sends a second capability report message when re-requesting to attach to the first cell, and carrier aggregation capabilities of the terminal device are disabled.

18 Claims, 8 Drawing Sheets

(51) Int. Cl.
*H04W 60/06* (2009.01)
*H04W 76/20* (2018.01)

(56) References Cited

U.S. PATENT DOCUMENTS

2018/0220484 A1 8/2018 Wu
2018/0343689 A1 11/2018 Wu et al.

FOREIGN PATENT DOCUMENTS

| CN | 105407511 A | 3/2016 |
| CN | 105790907 A | 7/2016 |
| CN | 105897386 A | 8/2016 |
| CN | 105991255 A | 10/2016 |
| CN | 108055698 A | 5/2018 |
| WO | 2016026066 A1 | 2/2016 |

OTHER PUBLICATIONS

European Search Report issued in corresponding European Application No. 19922737.2, dated Feb. 10, 2022, pp. 1-30.

RECONFIGURATION METHOD, TERMINAL DEVICE, AND COMMUNICATIONS SYSTEM

CROSS-REFERENCE TO RELATED APPLICATIONS

This application is a national stage of International Application No. PCT/CN2019/080628, filed on Mar. 29, 2019, which is hereby incorporated by reference in its entirety.

TECHNICAL FIELD

This application relates to the communications field, and in particular, to a reconfiguration method, a terminal device, and a communications system.

BACKGROUND

In an existing communications system, a frequency band support capability reported by a terminal device carries only frequency band indication information, but does not carry frequency band range information. A network device cannot know a spectrum actually supported by the terminal device. Because spectrum resources allocated by an operator are not fixed, once the operator adjusts a spectrum range, a frequency band of the network device may be spread, so that a frequency band range supported by the terminal device is less than a frequency band range of the network device obtained after the spreading. In other words, the network device has a frequency (an invalid frequency) that is not supported by the terminal device.

When performing reconfiguration for the terminal device, the network device may indicate the terminal device to work on a frequency that is not supported by the terminal device. In this case, the terminal device fails in reconfiguration. When the network device does not know a reason why the terminal device fails in the reconfiguration, the network device selects to repeat a reconfiguration process according to an existing communications protocol. Therefore, the terminal device may enter an infinite loop in the reconfiguration process.

SUMMARY

This application provides a reconfiguration method, a terminal device, and a communications system, to avoid a case in which the terminal device enters an infinite loop in a reconfiguration process.

According to a first aspect, embodiments of this application provide a communications system, including a terminal device and a network device.

The terminal device sends a first capability report message when requesting to attach to a first cell, where the first capability report message indicates a frequency band support capability and a carrier aggregation capability of the terminal device;
  the network device sends a reconfiguration request message to the terminal device, where the reconfiguration request message is used to indicate, to the terminal device, a frequency of a secondary cell in which carrier aggregation is performed;
  when the terminal device receives the reconfiguration request message for N consecutive times and all reconfiguration fails, the terminal device sends a detach request message and completes detaching from the first cell, where N is a positive integer; and
  the terminal device sends a second capability report message when re-requesting to attach to the first cell, where a first carrier aggregation capability of the terminal device is disabled in the second capability report message, and the first carrier aggregation capability includes a carrier aggregation capability in at least one of the following combinations:
  a combination of a frequency band of the first cell and a frequency band in which the frequency is located; or
  all combinations including a frequency band of the first cell; or
  all combinations including a frequency band in which the frequency is located.

In this embodiment, when the terminal device performs reconfiguration based on the received reconfiguration request message for a plurality of consecutive times but fails in the reconfiguration, the terminal device detaches from the network device, and resends an attach request message to the network device. Carrier aggregation capabilities in at least the frequency band in which the frequency indicated by the reconfiguration request message is located or the frequency band of the cell is disabled in the capability report message that is sent in the reattaching process. When a plurality of reconfiguration failures are detected, reattaching is performed, and some carrier aggregation of the terminal device is disabled, so that an infinite loop of reconfiguration can be ended, and communication of the terminal device is not affected.

According to a second aspect, embodiments of this application provide a communications system, including a terminal device and a network device.

The terminal device sends a first capability report message when requesting to attach to a first cell, where the first capability report message indicates a frequency band support capability and a carrier aggregation capability of the terminal device;
  the network device sends a reconfiguration request message to the terminal device, where the reconfiguration request message is used to indicate, to the terminal device, a frequency of a secondary cell in which carrier aggregation is performed;
  when the terminal device receives the reconfiguration request message for N consecutive times and all reconfiguration fails, the terminal device sends a detach request message and completes detaching from the first cell, where N is a positive integer; and
  the terminal device sends a second capability report message when re-requesting to attach to the first cell, where carrier aggregation capabilities of the terminal device in all frequency bands are disabled in the second capability report message.

In this embodiment, when the terminal device performs reconfiguration based on the received reconfiguration request message for a plurality of consecutive times but fails in the reconfiguration, the terminal device detaches from the network device, and resends an attach request message to the network device. A carrier aggregation capability of the terminal device is disabled in a capability report message that is sent in the reattaching process. When a plurality of reconfiguration failures are detected, reattaching is performed, and carrier aggregation of the terminal device is disabled, so that an infinite loop of reconfiguration can be ended, and communication of the terminal device is not affected.

According to a third aspect, embodiments of this application provide a communications system, including a terminal device and a network device.

The terminal device is configured to send a first capability report message when requesting to attach to a first cell, where the first capability report message indicates a frequency band support capability and a carrier aggregation capability of the terminal device;

the network device is configured to send a reconfiguration request message to the terminal device, where the reconfiguration request message is used to indicate, to the terminal device, a frequency of a secondary cell in which carrier aggregation is performed or a frequency of a cell to which the terminal device is handed over; and the terminal device is further configured to: when the reconfiguration request message is received for N consecutive times and all reconfiguration fails, send a detach request message and complete detaching from the first cell, where N is a positive integer; and send a second capability report message when requesting to attach to a second cell, where the second cell is a cell different from the first cell, and the second capability report message indicates a frequency band support capability and a carrier aggregation capability of the terminal device.

In this embodiment, when the terminal device performs reconfiguration based on the received reconfiguration request message for a plurality of consecutive times but fails in the reconfiguration, the terminal device detaches from the network device, and resends an attach request message to the network device, so that the terminal device attaches to a different cell. When detecting that reconfiguration fails for a plurality of times, the terminal device is attached to a different cell, so that an infinite loop of reconfiguration can be ended, and communication of the terminal device is not affected.

According to a fourth aspect, embodiments of this application provide a terminal device. The terminal device can sequentially perform the method steps on the terminal device side of the communications system provided in the first aspect to the third aspect, and have a same or similar technical effect.

In a feasible implementation, the terminal device includes a memory, a processor, and a transceiver.

The transceiver is configured to send a first capability report message when the terminal device requests to attach to a first cell, where the first capability report message indicates a frequency band support capability and a carrier aggregation capability of the terminal device;

when the processor determines that a first reconfiguration request message is received for N consecutive times and all reconfiguration fails, the transceiver is further configured to send a detach request message and complete detaching from the first cell, where the first reconfiguration request message is used to indicate, to the terminal device, a frequency of a secondary cell in which carrier aggregation is performed, and N is a positive integer; and the transceiver is further configured to send a second capability report message when the terminal device re-requests to attach to the first cell, where a first carrier aggregation capability of the terminal device is disabled in the second capability report message, and the first carrier aggregation capability includes a carrier aggregation capability in at least one of the following combinations:

a combination of a frequency band of the first cell and a frequency band in which the frequency is located; or all combinations including a frequency band of the first cell; or all combinations including a frequency band in which the frequency is located.

Further, after the transceiver sends the second capability report message, when the processor determines that a second reconfiguration request message is received for M consecutive times and all reconfiguration fails, the transceiver is further configured to send a detach request message and complete detaching from the first cell, where the second reconfiguration request message is used to indicate, to the terminal device, a frequency of a secondary cell in which carrier aggregation is performed, and M is a positive integer; and the transceiver is further configured to send a third capability report message when the terminal device re-requests to attach to the first cell, where carrier aggregation capabilities of the terminal device in all bands are disabled in the third capability report message.

Further, after the transceiver sends the third capability report message, when the processor determines that a third reconfiguration request message is received for L consecutive times and all reconfiguration fails, the transceiver is further configured to send a detach request message and complete detaching from the first cell, where the third reconfiguration request message is used to indicate, to the terminal device, a frequency of a secondary cell in which carrier aggregation is performed or a frequency of a cell to which the terminal device is handed over, and L is a positive integer; and the transceiver is further configured to send a fourth capability report message when the terminal device requests to attach to a second cell, where the second cell is a cell different from the first cell, and the fourth capability report message indicates a frequency band support capability of the terminal device.

In a feasible implementation, the processor is further configured to add the first cell to a bad cell list, where a cell in the bad cell list is a cell to which the terminal device is forbidden to attach.

In a feasible implementation, the processor is further configured to delete the first cell from the bad cell list after the terminal device is powered off or restarted or after a preset period of time.

In this embodiment, when the terminal device performs reconfiguration based on the received reconfiguration request message for a plurality of consecutive times but fails in the reconfiguration, the terminal device detaches from the network device, and resends an attach request message to the network device. In a capability report message that is sent in the reattaching process, some carrier aggregation capabilities of the terminal device are first disabled, then all carrier aggregation capabilities of the terminal device are disabled, and finally the terminal device may select to be attached to a different cell. When a plurality of reconfiguration failures are detected, some or all carrier aggregation capabilities of the terminal device are disabled, or the terminal device is attached to a different cell, so that an infinite loop of reconfiguration can be ended, and communication of the terminal device is not affected.

According to a fifth aspect, embodiments of this application provide a terminal device. The terminal device can sequentially perform the method steps on the terminal device side of the communications system provided in the second aspect and the third aspect, and have a same or similar technical effect.

In a feasible implementation, the terminal device includes a memory, a processor, and a transceiver.

The transceiver is configured to send a first capability report message when the terminal device requests to attach to a first cell, where the first capability report message indicates a frequency band support capability and a carrier aggregation capability of the terminal device;

when the processor determines that a first reconfiguration request message is received for N consecutive times and all reconfiguration fails, the transceiver is further configured to send a detach request message and complete detaching from the first cell, where the first reconfiguration request message is used to indicate, to the terminal device, a frequency of a secondary cell in which carrier aggregation is performed, and N is a positive integer; and the transceiver is further configured to send a second capability report message when the terminal device re-requests to attach to the first cell, where carrier aggregation capabilities of the terminal device in all bands are disabled in the second capability report message.

Further, after the transceiver sends the second capability report message, when the processor determines that a second reconfiguration request message is received for M consecutive times and all reconfiguration fails, the transceiver is further configured to send a detach request message and complete detaching from the first cell, where the second reconfiguration request message is used to indicate, to the terminal device, a frequency of a secondary cell in which carrier aggregation is performed or a frequency of a cell to which the terminal device is handed over, and M is a positive integer; and the transceiver is further configured to send a third capability report message when the terminal device requests to attach to a second cell, where the second cell is a cell different from the first cell, and the third capability report message indicates a frequency band support capability of the terminal device.

In a feasible implementation, the processor is further configured to add the first cell to a bad cell list, where a cell in the bad cell list is a cell to which the terminal device is forbidden to attach.

In a feasible implementation, the processor is further configured to delete the first cell from the bad cell list after the terminal device is powered off or restarted or after a preset period of time.

In this embodiment, when the terminal device performs reconfiguration based on the received reconfiguration request message for a plurality of consecutive times but fails in the reconfiguration, the terminal device detaches from the network device, and resends an attach request message to the network device. In a capability report message that is sent in the reattaching process, all carrier aggregation capabilities of the terminal device may be disabled. If a reconfiguration loop still exists, the terminal device may select to be attached to a different cell. When a plurality of reconfiguration failures are detected, all carrier aggregation capabilities of the terminal device are disabled, or the terminal device is attached to a different cell, so that an infinite loop of reconfiguration can be ended, and communication of the terminal device is not affected.

According to a sixth aspect, embodiments of this application provide a terminal device. The terminal device can perform the method steps on the terminal device side of the communications system provided in the third aspect, and have a same or similar technical effect.

In a feasible implementation, the terminal device includes a memory, a processor, and a transceiver.

The transceiver is configured to send a first capability report message when the terminal device requests to attach to a first cell, where the first capability report message indicates a frequency band support capability and a carrier aggregation capability of the terminal device;

when the processor determines that a reconfiguration request message is received for N consecutive times and all reconfiguration fails, the transceiver is further configured to send a detach request message and complete detaching from the first cell, where the reconfiguration request message is used to indicate, to the terminal device, a frequency of a secondary cell in which carrier aggregation is performed or a frequency of a cell to which the terminal device is handed over, and N is a positive integer; and the transceiver is further configured to send a second capability report message when the terminal device requests to attach to a second cell, where the second cell is a cell different from the first cell, and the second capability report message indicates a frequency band support capability and a carrier aggregation capability of the terminal device.

In a feasible implementation, the processor is further configured to add the first cell to a bad cell list, where a cell in the bad cell list is a cell to which the terminal device is forbidden to attach.

In a feasible implementation, the processor is further configured to delete the first cell from the bad cell list after the terminal device is powered off or restarted or after a preset period of time.

In this embodiment, when the terminal device performs reconfiguration based on the received reconfiguration request message for a plurality of consecutive times but fails in the reconfiguration, the terminal device detaches from the network device, and resends an attach request message to the network device, so that the terminal device attaches to a different cell. When a plurality of reconfiguration failures are detected, the terminal device is attached to a different cell, so that an infinite loop of reconfiguration can be ended, and communication of the terminal device is not affected.

According to a seventh aspect, embodiments of this application provide a reconfiguration method. The reconfiguration method may be performed by the terminal device provided in the fourth aspect, and have a same or similar technical effect.

In a feasible implementation, the reconfiguration method includes:

The terminal device sends a first capability report message when requesting to attach to a first cell, where the first capability report message indicates a frequency band support capability and a carrier aggregation capability of the terminal device;

when a first reconfiguration request message is received for N consecutive times and all reconfiguration fails, the terminal device sends a detach request message and completes detaching from the first cell, where the first reconfiguration request message is used to indicate, to the terminal device, a frequency of a secondary cell in which carrier aggregation is performed, and N is a positive integer; and the terminal device sends a second capability report message when re-requesting to attach to the first cell, where a first carrier aggregation capability of the terminal device is disabled in the second capability report message, and the first carrier aggregation capability includes a carrier aggregation capability in at least one of the following combinations:
a combination of a frequency band of the first cell and a frequency band in which the frequency is located; or
all combinations including a frequency band of the first cell; or
all combinations including a frequency band in which the frequency is located.

In a feasible implementation, after the second capability report message is sent, the reconfiguration method further includes:

When a second reconfiguration request message is received for M consecutive times and all reconfiguration fails, the terminal device sends a detach request message and completes detaching from the first cell, where the second reconfiguration request message is used to indicate, to the terminal device, a frequency of a secondary cell in which carrier aggregation is performed, and M is a positive integer; and the terminal device sends a third capability report message when re-requesting to attach to the first cell, where carrier aggregation capabilities of the terminal device in all bands are disabled in the third capability report message.

In a feasible implementation, after the sending a second capability report message, the reconfiguration method further includes:

When a third reconfiguration request message is received for L consecutive times and all reconfiguration fails, the terminal device sends a detach request message and completes detaching from the first cell, where the third reconfiguration request message is used to indicate, to the terminal device, a frequency of a secondary cell in which carrier aggregation is performed or a frequency of a cell to which the terminal device is handed over, and L is a positive integer; and the terminal device sends a fourth capability report message when requesting to attach to a second cell, where the second cell is a cell different from the first cell, and the fourth capability report message indicates a frequency band support capability of the terminal device.

In a feasible implementation, the reconfiguration method further includes:

The terminal device adds the first cell to a bad cell list, where a cell in the bad cell list is a cell to which the terminal device is forbidden to attach.

In a feasible implementation, after the terminal device adds the first cell to the bad cell list, the reconfiguration method further includes:

The terminal device deletes the first cell from the bad cell list after the terminal device is powered off or restarted or after a preset period of time.

According to an eighth aspect, embodiments of this application provide a reconfiguration method. The reconfiguration method may be performed by the terminal device provided in the fifth aspect, and have a same or similar technical effect.

In a feasible implementation, the reconfiguration method includes:

The terminal device sends a first capability report message when requesting to attach to a first cell, where the first capability report message indicates a frequency band support capability and a carrier aggregation capability of the terminal device;

when a first reconfiguration request message is received for N consecutive times and all reconfiguration fails, the terminal device sends a detach request message and completes detaching from the first cell, where the first reconfiguration request message is used to indicate, to the terminal device, a frequency of a secondary cell in which carrier aggregation is performed, and N is a positive integer; and the terminal device sends a second capability report message when re-requesting to attach to the first cell, where carrier aggregation capabilities of the terminal device in all bands are disabled in the second capability report message.

In a feasible implementation, the reconfiguration method further includes:

When a second reconfiguration request message is received for M consecutive times and all reconfiguration fails, the terminal device sends a detach request message and completes detaching from the first cell, where the second reconfiguration request message is used to indicate, to the terminal device, a frequency of a secondary cell in which carrier aggregation is performed or a frequency of a cell to which the terminal device is handed over, and M is a positive integer; and the terminal device sends a third capability report message when requesting to attach to a second cell, where the second cell is a cell different from the first cell, and the third capability report message indicates a frequency band support capability of the terminal device.

In a feasible implementation, the reconfiguration method further includes:

The terminal device adds the first cell to a bad cell list, where a cell in the bad cell list is a cell to which the terminal device is forbidden to attach.

In a feasible implementation, after the terminal device adds the first cell to the bad cell list, the reconfiguration method further includes:

The terminal device deletes the first cell from the bad cell list after the terminal device is powered off or restarted or after a preset period of time.

According to a ninth aspect, embodiments of this application provide a reconfiguration method. The reconfiguration method may be performed by the terminal device provided in the sixth aspect, and have a same or similar technical effect.

In a feasible implementation, the reconfiguration method includes:

The terminal device sends a first capability report message when requesting to attach to a first cell, where the first capability report message indicates a frequency band support capability and a carrier aggregation capability of the terminal device;

when a reconfiguration request message is received for N consecutive times and all reconfiguration fails, the terminal device sends a detach request message and completing detaching from the first cell, where the reconfiguration request message is used to indicate, to the terminal device, a frequency of a secondary cell in which carrier aggregation is performed or a frequency of a cell to which the terminal device is handed over, and N is a positive integer; and the terminal device sends a second capability report message when requesting to attach to a second cell, where the second cell is a cell different from the first cell, and the second capability report message indicates a frequency band support capability and a carrier aggregation capability of the terminal device.

In a feasible implementation, the reconfiguration method further includes:

The terminal device adds the first cell to a bad cell list, where a cell in the bad cell list is a cell to which the terminal device is forbidden to attach.

In a feasible implementation, after the terminal device adds the first cell to the bad cell list, the reconfiguration method further includes:

The terminal device deletes the first cell from the bad cell list after the terminal device is powered off or restarted or after a preset period of time.

According to a tenth aspect, embodiments of this application provide a reconfiguration apparatus. As a terminal device, the reconfiguration apparatus performs the reconfiguration method provided in the seventh aspect and the feasible implementations of the seventh aspect, and has a same or similar technical effect.

In a feasible implementation, the reconfiguration apparatus includes:
- a sending module, configured to send a first capability report message when the terminal device requests to attach to a first cell, where the first capability report message indicates a frequency band support capability and a carrier aggregation capability of the terminal device;
- a receiving module, configured to receive a first reconfiguration request message; and
- a reconfiguration module, configured to perform reconfiguration based on the received first reconfiguration request message, where
- the sending module is further configured to: when the reconfiguration module fails to perform reconfiguration for N consecutive times, send a detach request message and complete detaching from the first cell, where the first reconfiguration request message is used to indicate, to the terminal device, a frequency of a secondary cell in which carrier aggregation is performed, and N is a positive integer; and
- the sending module is further configured to send a second capability report message when the terminal device re-requests to attach to the first cell, where a first carrier aggregation capability of the terminal device is disabled in the second capability report message, and the first carrier aggregation capability includes a carrier aggregation capability in at least one of the following combinations:
- a combination of a frequency band of the first cell and a frequency band in which the frequency is located; or
- all combinations including a frequency band of the first cell; or
- all combinations including a frequency band in which the frequency is located.

In a feasible implementation, the sending module is further configured to: after the sending module sends the second capability report message, when the reconfiguration module fails to perform reconfiguration for M consecutive times, send a detach request message and complete detaching from the first cell, where a second reconfiguration request message is used to indicate, to the terminal device, a frequency of a secondary cell in which carrier aggregation is performed, and M is a positive integer; and
- the sending module is further configured to send a third capability report message when the terminal device re-requests to attach to the first cell, where carrier aggregation capabilities of the terminal device in all bands are disabled in the third capability report message.

In a feasible implementation, the sending module is further configured to: after the sending module sends the second capability report message, when the reconfiguration module fails to perform reconfiguration for L consecutive times, send a detach request message and complete detaching from the first cell, where a third reconfiguration request message is used to indicate, to the terminal device, a frequency of a secondary cell in which carrier aggregation is performed or a frequency of a cell to which the terminal device is handed over, and L is a positive integer; and
- the sending module is further configured to send a fourth capability report message when the terminal device requests to attach to a second cell, where the second cell is a cell different from the first cell, and the fourth capability report message indicates a frequency band support capability of the terminal device.

In a feasible implementation, the reconfiguration apparatus further includes:
- a bad cell maintenance module, configured to add the first cell to a bad cell list, where a cell in the bad cell list is a cell to which the terminal device is forbidden to attach.

In a feasible implementation, the bad cell maintenance module is further configured to delete the first cell from the bad cell list after the terminal device is powered off or restarted or after a preset period of time.

According to an eleventh aspect, embodiments of this application provide a reconfiguration apparatus. As a terminal device, the reconfiguration apparatus performs the reconfiguration method provided in the eighth aspect and the feasible implementations of the eighth aspect, and has a same or similar technical effect.

In a feasible implementation, the reconfiguration apparatus includes:
- a sending module, configured to send a first capability report message when the terminal device requests to attach to a first cell, where the first capability report message indicates a frequency band support capability and a carrier aggregation capability of the terminal device;
- a receiving module, configured to receive a first reconfiguration request message; and
- a reconfiguration module, configured to perform reconfiguration based on the received first reconfiguration request message, where
- the sending module is further configured to: when the reconfiguration module fails to perform reconfiguration for N consecutive times, send a detach request message and complete detaching from the first cell, where a first reconfiguration request message is used to indicate, to the terminal device, a frequency of a secondary cell in which carrier aggregation is performed, and N is a positive integer; and
- the sending module is further configured to send a second capability report message when the terminal device re-requests to attach to the first cell, where carrier aggregation capabilities of the terminal device in all bands are disabled in the second capability report message.

In a feasible implementation, the sending module is further configured to: when the reconfiguration module fails to perform reconfiguration for M consecutive times, send a detach request message and complete detaching from the first cell, where a second reconfiguration request message is used to indicate, to the terminal device, a frequency of a secondary cell in which carrier aggregation is performed or a frequency of a cell to which the terminal device is handed over, and M is a positive integer; and the sending module is further configured to send a third capability report message when the terminal device requests to attach to a second cell, where the second cell is a cell different from the first cell, and the third capability report message indicates a frequency band support capability of the terminal device.

In a feasible implementation, the reconfiguration apparatus further includes:
a bad cell maintenance module, configured to add the first cell to a bad cell list, where a cell in the bad cell list is a cell to which the terminal device is forbidden to attach.

In a feasible implementation, the bad cell maintenance module is further configured to delete the first cell from the bad cell list after the terminal device is powered off or restarted or after a preset period of time.

According to a twelfth aspect, embodiments of this application provide a reconfiguration apparatus. As a terminal device, the reconfiguration apparatus performs the reconfiguration method provided in the ninth aspect and the feasible implementations of the ninth aspect, and has a same or similar technical effect.

In a feasible implementation, the reconfiguration apparatus includes:
a sending module, configured to send a first capability report message when the terminal device requests to attach to a first cell, where the first capability report message indicates a frequency band support capability and a carrier aggregation capability of the terminal device;
a receiving module, configured to receive a first reconfiguration request message; and
a reconfiguration module, configured to perform reconfiguration based on the received first reconfiguration request message, where
the sending module is further configured to: when the reconfiguration module fails to perform reconfiguration for N consecutive times, send a detach request message and complete detaching from the first cell, where a reconfiguration request message is used to indicate, to the terminal device, a frequency of a secondary cell in which carrier aggregation is performed or a frequency of a cell to which the terminal device is handed over, and N is a positive integer; and
the sending module is further configured to send a second capability report message when the terminal device requests to attach to a second cell, where the second cell is a cell different from the first cell, and the second capability report message indicates a frequency band support capability and a carrier aggregation capability of the terminal device.

In a feasible implementation, the reconfiguration apparatus further includes:
a bad cell maintenance module, configured to add the first cell to a bad cell list, where a cell in the bad cell list is a cell to which the terminal device is forbidden to attach.

In a feasible implementation, the bad cell maintenance module is further configured to delete the first cell from the bad cell list after the terminal device is powered off or restarted or after a preset period of time.

According to a thirteenth aspect, embodiments of this application provide a terminal device. The terminal device includes a processor, a memory, a receiver, and a transmitter. The receiver and the transmitter are both coupled to the processor. The processor controls a receiving action of the receiver, and controls a sending action of the transmitter.

The memory is configured to store computer executable program code, and the program code includes instructions. When the processor executes the instructions, the instructions enable the terminal device to perform the method provided in the seventh aspect to the ninth aspect and the feasible implementations of the aspects.

According to a fourteenth aspect, embodiments of this application provide a communications apparatus, including units, modules, or circuits configured to perform the methods provided in the seventh aspect to the ninth aspect and the feasible implementations of the aspects. The communications apparatus may be a terminal device, or may be a module in a terminal device, for example, a chip in the terminal device.

According to a fifteenth aspect, embodiments of this application provide a computer program product including instructions. When the computer program product is run on a computer, the computer is enabled to perform the methods provided in the seventh aspect to the ninth aspect and the feasible implementations of the aspects.

According to a sixteenth aspect, embodiments of this application provide a computer-readable storage medium. The computer-readable storage medium stores instructions, and when the instructions are run on a computer, the computer is enabled to perform the methods provided in the seventh aspect to the ninth aspect and the feasible implementations of the aspects.

According to a seventeenth aspect, embodiments of this application provide a chip. The chip stores a computer program, and when the computer program is executed by the chip, the methods provided in the seventh aspect to the ninth aspect and the feasible implementations of the aspects are implemented.

The embodiments of this application provide the reconfiguration method, the terminal device, and the communications system. The method includes: The terminal device sends the first capability report message when requesting to attach to the first cell. When the reconfiguration request message is received for N consecutive times and all reconfiguration fails, the terminal device detaches from the first cell, where the first reconfiguration request message is used to indicate, to the terminal device, the frequency of the secondary cell in which carrier aggregation is performed, and N is a positive integer. The terminal device sends the second capability report message when re-requesting to attach to the first cell, where the second capability report message disables the carrier aggregation capability of the terminal device in at least the combination of the frequency band of the first cell and the frequency band in which the frequency is located. Some carrier aggregation capabilities of the terminal device are disabled, so that an infinite loop of reconfiguration can be ended, and communication of the terminal device is not affected.

In this application, based on the implementations provided in the foregoing aspects, the implementations may be further combined to provide more implementations.

DESCRIPTION OF EMBODIMENTS

Figure 1:
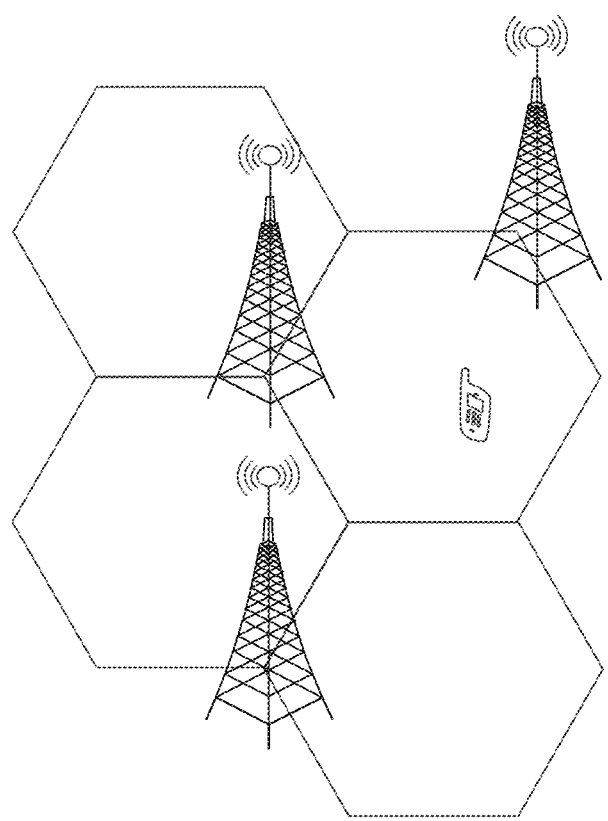
FIG. 1 is a schematic diagram of a possible architecture of a communications system to which an embodiment of this application is applicable.

FIG. 1 is a schematic diagram of a possible architecture of a communications system to which an embodiment of this application is applicable. As shown in FIG. 1, the communications system may include a terminal device and at least one network device.

The terminal device, or referred to as user equipment (UE), may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a cellular phone) and a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communication service (PCS) phone, a cordless telephone, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, or a user agent. This is not limited in this application. FIG. 1 is described by using an example in which the terminal device is a mobile phone.

The network device is a device that connects the terminal device to a wireless network, and may be a base transceiver station (BTS) in a global system for mobile communications (GSM), a NodeB in a universal mobile telecommunications system (UMTS), an evolved NodeB (Evolutional NodeB, eNB, or eNodeB) in long term evolution (LTE), a relay station or an access point, a base station in a future fifth generation mobile communications (the 5th Generation Mobile Communication, 5G) network, or a relay station, an access point, a vehicle-mounted device, a wearable device, or the like that works in a high frequency band. This is not limited in this application. FIG. 1 is described by using an example in which the network device is a base station.

When attaching to a cell of the network device, the terminal device reports a capability to the network device. Capability report information includes information about a frequency band supported by the terminal device. For example, the terminal device sends frequency band identifiers B41, B42, n77, n78, and n79 to the network device. The network device may determine, based on the reported frequency band information, a frequency band range corresponding to the frequency band information. For example, when the frequency band information reported by the terminal device is B42, the network device allocates a radio resource control (RRC) connection reconfiguration message to the terminal device within a frequency band range corresponding to the frequency band information B42. The RRC connection reconfiguration message is also referred to as a reconfiguration request message below. The RRC connection reconfiguration message includes information about a frequency configured by the network device for the terminal device, and the frequency falls within the frequency band range corresponding to the frequency band information. When a location of the terminal device changes or when the terminal device supports carrier aggregation, the network device may perform RRC connection reconfiguration on the terminal device, so that the terminal device attaches to another cell, or the terminal device attaches to both a primary cell and a secondary cell. The RRC connection reconfiguration message carries information about a new frequency, and the new frequency also falls within the frequency band range corresponding to B42.

However, the terminal device may not support all spectrums of the reported frequency band, and a specific frequency band range corresponding to frequency band information allocated by an operator may also change. For example, if the terminal supports only 3480 MHz to 3600 MHz of B42, the operator may adjust a frequency band range, and a frequency band: 3400 MHz to 3480 MHz is added to the adjusted B42. The RRC connection reconfiguration message delivered by the network device to the terminal device may carry a frequency in a frequency band: 3400 MHz to 3480 MHz. In other words, the network device has a frequency that is not supported by the terminal device. When the terminal device performs reconfiguration based on an unsupported frequency, the terminal device cannot succeed in reconfiguration. As a result, the terminal device enters an infinite loop in a reconfiguration process, and normal communication of the terminal device is affected.

Figure 2:
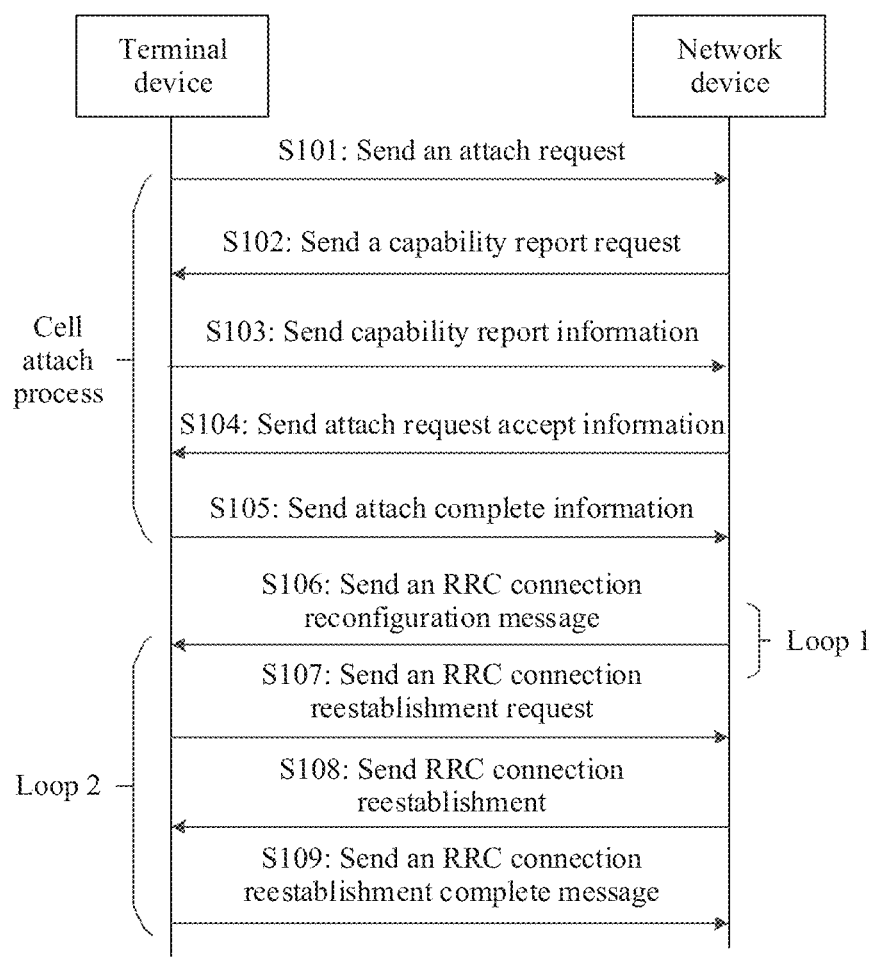
FIG. 2 is a possible schematic signaling flowchart of performing, by a network device, reconfiguration for a terminal device.

FIG. 2 is a possible schematic signaling flowchart of performing, by a network device, reconfiguration for a terminal device. As shown in FIG. 2, a reconfiguration signaling procedure of the terminal device includes the following steps:

S101: The terminal device sends an attach request to the network device.

For example, the network device attaches the terminal to a first cell based on the attach request (Attach Request).

S102: The network device sends a capability report request to the terminal device.

For example, after receiving the attach request, the network device sends the capability report request (UE Capability Enquiry) to the terminal device, to request the terminal device to report a capability.

S103: The terminal device sends a capability report message to the network device.

For example, after receiving the capability report request, the terminal device sends the capability report message (UE Capability Information) to the network device to report a capability. For example, the capability report message carries an identifier of a frequency band supported by the terminal device and a carrier aggregation capability of the terminal device. For example, the capability report message of the terminal device carries two frequency band identifiers B41 and B42, and information that carrier aggregation in B41 and B42 is supported. It may be understood that when the terminal device uses the capability report message to carry a plurality of frequency band identifiers, the terminal device may further indicate that carrier aggregation in the plurality of frequency bands is supported, or a combination of frequency bands in which carrier aggregation can be performed in the plurality of frequency bands.

S104: The network device sends attach request accept information to the terminal device.

For example, the network device sends the attach request accept information (Attach Accept) to the terminal device, to indicate, to the terminal device, that the network device completes cell attach of the terminal device.

S105: The terminal device sends attach complete information to the network device.

For example, after receiving the attach request accept information sent by the network device, the terminal device sends the attach complete information (Attach Complete) to the network device, to complete attaching the terminal device to the first cell through the network device. The first cell is a primary cell.

S106: The network device sends an RRC connection reconfiguration message to the terminal device.

For example, the RRC connection reconfiguration message (RRC Connection Reconfiguration) carries frequency information, and a frequency selected by the network device falls within a frequency band range indicated by the frequency band identifier in the capability report message sent by the terminal device. For example, the network device configures a second cell as a secondary cell for the terminal device, and a frequency corresponding to the second cell falls within a frequency band range corresponding to B42. When the specific frequency band range corresponding to B42 changes, the frequency of the second cell may be a frequency that is not supported by the terminal device. In this embodiment, the frequency carried in the RRC connection reconfiguration message is a frequency that is not supported by the terminal device.

For example, when the terminal device detects that the frequency carried in the RRC connection reconfiguration message is an unsupported frequency, the terminal device cannot perform RRC connection based on the RRC connection reconfiguration message. In this case, the network device cannot receive a response message from the terminal device. When the network device does not receive, within a period of time after sending the RRC connection reconfiguration message, the response message that corresponds to the RRC connection reconfiguration message and that is sent by the terminal device, the network device sends the RRC connection reconfiguration message to the terminal device again. In other words, the network device performs S106 again. Each time the network device performs S106, the RRC connection reconfiguration message sent by the network device remains unchanged. That is, the RRC connection reconfiguration messages all carry the frequency that is not supported by the terminal device. Therefore, the network device enters a loop of repeatedly sending the RRC connection reconfiguration message, and communication efficiency between the terminal device and the network device is affected.

For example, the RRC connection reconfiguration message may indicate the terminal device to report measurement information during reconfiguration performed based on the RRC connection reconfiguration message. That is, the RRC connection reconfiguration message indicates a scenario with measurement. The RRC connection reconfiguration message may alternatively indicate the terminal device not to report measurement information during reconfiguration performed based on the RRC connection reconfiguration message. That is, the RRC connection reconfiguration message indicates a scenario without measurement.

In the scenario with measurement, after the terminal device determines that the frequency carried in the RRC connection reconfiguration message is an unsupported frequency, the terminal device cannot perform measurement based on the unsupported frequency. The terminal device may not send any information to the network device, and the network device repeatedly performs S106. That is, the network device enters a loop 1 shown in FIG. 2.

In the scenario without measurement, after the terminal device determines that the frequency carried in the RRC connection reconfiguration message is an unsupported frequency, the terminal device sends an RRC connection reestablishment request (RRC Connection Reestablishment Request) to the network device. For example, S107 is performed after S106.

S107: The terminal device sends the RRC connection reestablishment request to the network device.

S108: The network device sends RRC connection reestablishment to the terminal device.

For example, after receiving the RRC connection reestablishment request, the network device sends the RRC connection reestablishment (RRC Connection Reestablishment) to the terminal device. The terminal device performs RRC reconnection based on the RRC connection reestablishment.

S109: The terminal device sends an RRC connection reestablishment complete message to the network device.

For example, after completing the RRC reconnection, the terminal device sends the RRC connection reestablishment complete message (RRC Connection Reestablishment Complete) to the network device.

For example, after receiving the RRC connection reestablishment complete message sent by the terminal device, the network device resends the RRC connection reconfiguration message to the terminal device because the network device does not know that the terminal device performs RRC connection reestablishment. That is, S106 is performed again. In this case, the network device and the terminal device enter a loop 2 shown in FIG. 2.

Therefore, when the frequency band information changes, the network device may indicate, in the RRC connection reconfiguration message, a frequency that is not supported by the terminal device. As a result, the network device cyclically sends the RRC connection reconfiguration message, and normal communication between the terminal device and the network device is affected.

To resolve the foregoing problem, this application provides at least a reconfiguration method and a device in the following embodiments. The following describes in detail the reconfiguration method and the device provided in this application by way of various example embodiments. In the following example embodiments, same or similar concepts or processes may not be described in detail in some embodiments.

Embodiment 1

Figure 3:
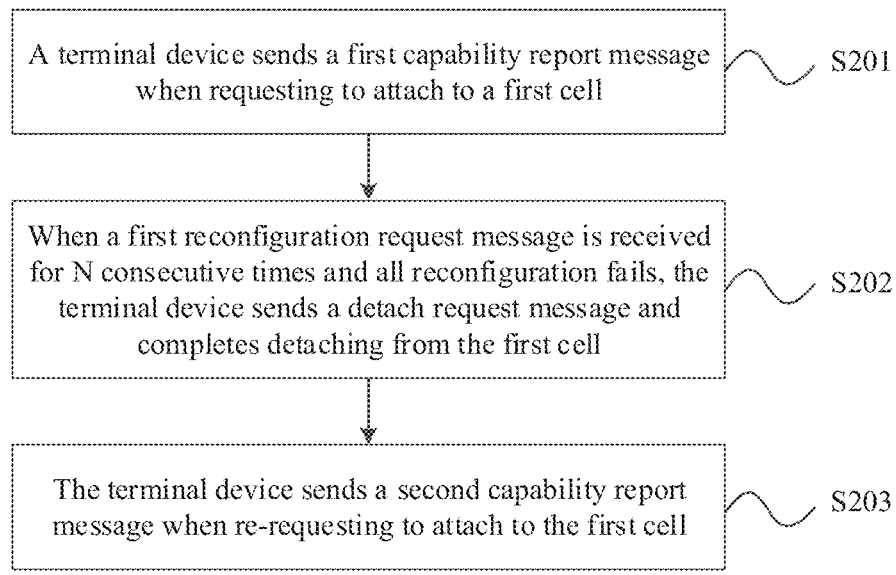
FIG. 3 is a schematic flowchart 1 of a reconfiguration method according to an embodiment of this application.

An aspect of this application provides a reconfiguration method. FIG. 3 is a schematic flowchart 1 of a reconfiguration method according to an embodiment of this application. This embodiment may be performed by the terminal device in the communications system shown in FIG. 1. In this embodiment, when detecting reconfiguration for a plurality of times, the terminal device performs reattaching, and disables some carrier aggregation capabilities of the terminal device during capability reporting, to ensure communication of the terminal device. As shown in FIG. 3, the reconfiguration method provided in this embodiment of this application includes the following steps.

S201: The terminal device sends a first capability report message when requesting to attach to a first cell.

The first capability report message indicates a frequency band support capability and a carrier aggregation capability of the terminal device.

For example, after selecting a network device and a cell to which the terminal device attaches, the terminal device sends an attach request to the network device. In a process of attaching to the first cell of the network device, the terminal device sends the first capability report message to the network device, to perform capability reporting. For example, the first capability report message may be the UE capability information in the embodiment shown in FIG. 2, and the first capability report message includes the frequency band support capability of the terminal device.

S202: When a first reconfiguration request message is received for N consecutive times and all reconfiguration fails, the terminal device sends a detach request message and completes detaching from the first cell.

N is a positive integer, and the first reconfiguration request message is used to indicate, to the terminal device, a frequency of a secondary cell in which carrier aggregation is performed.

For example, the network device may deliver a carrier aggregation indication to the terminal device based on capability information reported by the terminal device and a load status of the cell in which the terminal device is located, to improve communication efficiency.

For example, the network device may deliver an RRC connection reconfiguration message to the terminal device, to configure a secondary cell for the terminal device, where a frequency of the secondary cell also falls within a frequency range corresponding to a supported frequency band indicated in a capability reporting process of the terminal device. The frequency of the secondary cell is different from a frequency of the first cell. The terminal device may transmit data on the frequencies of the first cell and the secondary cell by using a carrier aggregation technology.

After the network device spreads frequencies, a frequency range corresponding to a frequency band is spread. The frequency of the secondary cell configured for the terminal device falls within the frequency range corresponding to the frequency band supported by the terminal device, but is not a frequency supported by the terminal device. In this case, the terminal device cannot complete RRC connection reconfiguration based on the reconfiguration request message from the network device. For example, when the RRC connection reconfiguration message indicates the terminal device to perform measurement, when the terminal device determines that a frequency indicated by the RRC connection reconfiguration message is an invalid frequency, the terminal device does not perform measurement, and therefore does not complete RRC connection reestablishment. However, when the network device does not receive a reestablishment message from the terminal device, the network device repeatedly sends the RRC connection reconfiguration message. Similarly, when the RRC connection reconfiguration message indicates the terminal device not to perform measurement, when the terminal device determines that a frequency indicated by the RRC connection reconfiguration message is an invalid frequency, the terminal device does not perform reestablishment, and the network device repeatedly sends the RRC connection reconfiguration message.

To prevent RRC connection reconfiguration repeatedly performed by the terminal device and the network device from affecting data transmission, when the terminal device detects that the network device delivers the RRC connection reconfiguration message for N consecutive times, the terminal device may re-report a capability to the network device. For example, the terminal device sends a detach request message (detach) to the network device, to detach from the first cell.

For example, N is a positive integer, and a value of N may be 3.

S203: The terminal device sends a second capability report message when re-requesting to attach to the first cell.

A first carrier aggregation capability of the terminal device is disabled in the second capability report message. The first carrier aggregation capability includes a carrier aggregation capability in at least one of the following combinations:

a combination of a frequency band of the first cell and a frequency band in which the frequency is located; or all combinations including a frequency band of the first cell; or all combinations including a frequency band in which the frequency is located.

For example, the terminal device adjusts the frequency band support capability of the terminal device based on the first reconfiguration request message. When reattaching to the first cell, the terminal device disables carrier aggregation in a frequency band in which a frequency on which reconfiguration fails is located, so that the network device avoids selecting the frequency band when configuring a secondary cell for the terminal device again. This prevents the network device and the terminal device from entering an infinite loop of cyclic reconfiguration.

It may be understood that the second capability report message may further indicate another frequency band support capability of the terminal device other than the disabled carrier aggregation capability in the frequency band. That is, a difference between the second capability report message and the first capability report message lies in that some carrier aggregation capabilities of the terminal device are disabled. For example, the frequency band of the first cell is denoted as a frequency band A, and the frequency band in which the frequency that is not supported by the terminal device and that is indicated in the first reconfiguration request message is denoted as a frequency band B. In this case, in the second capability report message, a carrier aggregation capability of the terminal device in a combination of the frequency band A and the frequency band B may be disabled, or a carrier aggregation capability of the terminal device in any combination including the frequency band A is disabled, or a carrier aggregation capability of the terminal device in any combination including the frequency bands B is disabled.

It may be understood that when the terminal device is handed over from the first cell to another network device or another cell of the current network device, after sending an attach request message to the another cell for the first time, the terminal device may send the first capability report message. When the terminal device is handed over back to the first cell from another cell, the terminal device may send the second capability report message.

The reconfiguration method provided in this embodiment of this application includes: When the terminal device performs reconfiguration based on the received reconfiguration request message for a plurality of consecutive times but fails in the reconfiguration, the terminal device detaches from the network device, and resends an attach request message to the network device. Carrier aggregation capabilities in at least the frequency band in which the frequency indicated by the reconfiguration request message is located and the frequency band of the cell are disabled in the capability report message that is sent in the reattaching process. When a plurality of reconfiguration failures are detected, reattaching is performed, and some carrier aggregation of the terminal device is disabled, so that an infinite loop of reconfiguration can be ended, and communication of the terminal device is not affected.

Figure 4:
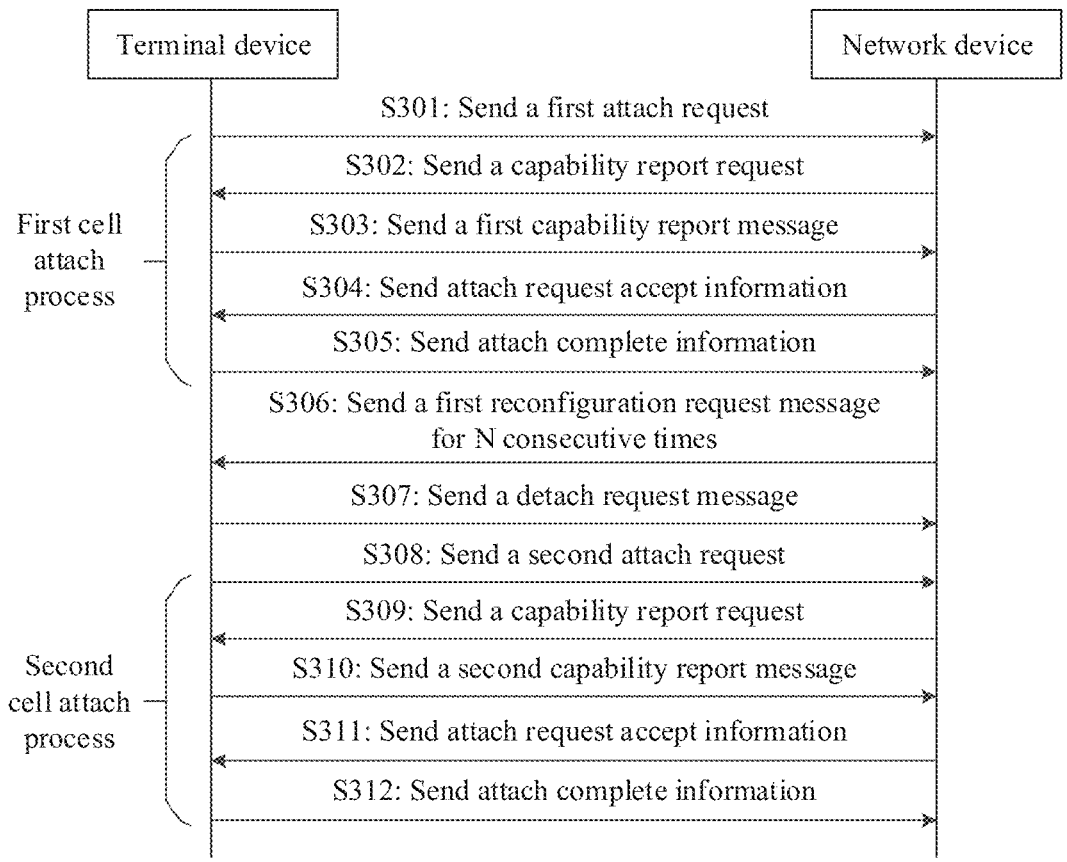
FIG. 4 is a schematic signaling flowchart 1 of a reconfiguration method according to an embodiment of this application.

FIG. 4 is a schematic signaling flowchart 1 of a reconfiguration method according to an embodiment of this application. This embodiment describes an example of a signaling procedure in the reconfiguration method shown in FIG. 3. As shown in FIG. 4, the reconfiguration method includes the following steps.

S301: A terminal device sends a first attach request to a network device.

S302: The network device sends a capability report request to the terminal device.

S303: The terminal device sends a first capability report message to the network device.

For example, the first capability report message indicates that identifiers of frequency bands supported by the terminal are X, Y, and Z, and the frequency bands supported by the terminal are denoted as a band X, a band Y, and a band Z, and carrier aggregation in any two of the band X, the band Y, and the band Z is supported.

S304: The network device sends attach request accept information to the terminal device.

S305: The terminal device sends attach complete information to the network device.

For example, the terminal device attaches to a first cell, and a frequency corresponding to the first cell is in the band X.

S301 to S305 in this embodiment are used to implement S201 in the embodiment shown in FIG. 3. S301 to S305 in this embodiment are the same as S101 to S105 in the embodiment shown in FIG. 2, and details are not described again in this application.

S306: The network device sends a first reconfiguration request message to the terminal device for N consecutive times.

For example, between two times of performing S306, S107 to S109 in the embodiment shown in FIG. 2 may be further included.

For example, in the first reconfiguration request message, a frequency in the band Y is configured for the terminal device as a frequency of a secondary cell of the terminal device, but the frequency in the band Y is a frequency that is not supported by the terminal device.

S307: The terminal device sends a detach request message to the network device.

For example, the terminal device completes detaching from the first cell.

S306 and S307 in this embodiment are used to implement S202 in the embodiment shown in FIG. 3.

S308: The terminal device sends a second attach request to the network device.

In this embodiment, the network device still attaches the terminal device to the first cell based on the second attach request.

S309: The network device sends a capability report request to the terminal device.

S310: The terminal device sends a second capability report message to the network device.

For example, in the second capability report message, a carrier aggregation capability of the terminal device in a combination of the band Y and any other band is disabled, or a carrier aggregation capability of the terminal device in a combination of the band X and any other band is disabled, or a carrier aggregation capability of the terminal device in a combination of the band X and the band Y is disabled.

S311: The network device sends attach request accept information to the terminal device.

S312: The terminal device sends attach complete information to the network device.

S308 to S312 in this embodiment are used to implement S203 in the embodiment shown in FIG. 3. S308 to S312 in this embodiment are the same as S101 to S105 in the embodiment shown in FIG. 2, and details are not described again in this application.

Embodiment 2

Figure 5:
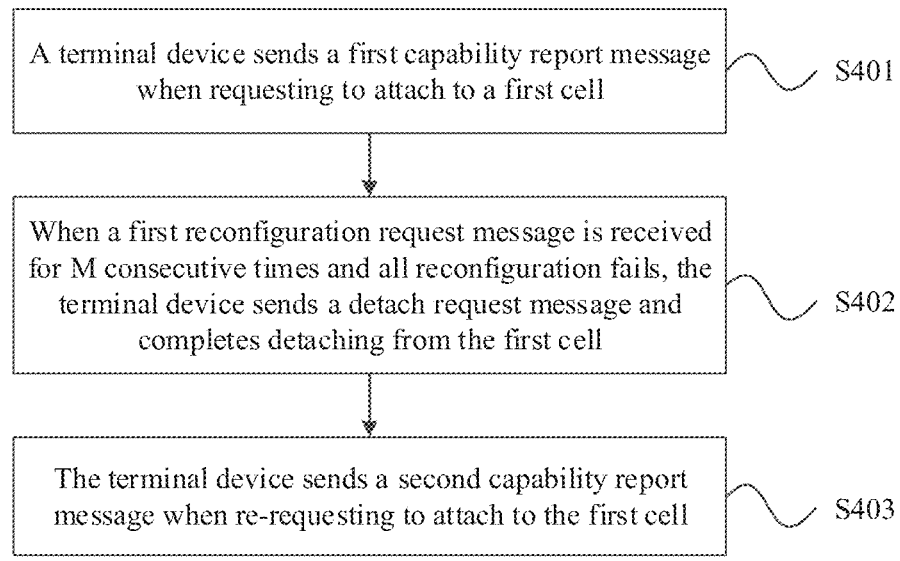
FIG. 5 is a schematic flowchart 2 of a reconfiguration method according to an embodiment of this application.

Another aspect of this application provides a reconfiguration method. FIG. 5 is a schematic flowchart 2 of a reconfiguration method according to an embodiment of this application. This embodiment may be performed by the terminal device in the communications system shown in FIG. 1. In this embodiment, when detecting reconfiguration for a plurality of times, the terminal device performs reattach, and disables a carrier aggregation capability of the terminal device during capability reporting, to ensure communication of the terminal device. As shown in FIG. 5, the reconfiguration method provided in this embodiment of this application includes the following steps.

S401: The terminal device sends a first capability report message when requesting to attach to a first cell.

S402: When a first reconfiguration request message is received for M consecutive times and all reconfiguration fails, the terminal device sends a detach request message and completes detaching from the first cell.

M is a positive integer, and the first reconfiguration request message is used to indicate, to the terminal device, a frequency band of a secondary cell in which carrier aggregation is performed.

For example, S401 and S402 in this embodiment are the same as S201 and S202 in the embodiment shown in FIG. 3, and details are not described again in this application.

S403: The terminal device sends a second capability report message when re-requesting to attach to the first cell.

The carrier aggregation capabilities of the terminal device in all frequency bands are disabled in the second capability report message.

For example, different from the embodiment shown in FIG. 3, in this embodiment, the terminal device adjusts a frequency band support capability of the terminal device based on the first reconfiguration request message. When reattaching to the first cell, the terminal device disables the carrier aggregation capability of the terminal device, so that a network device avoids configuring a secondary cell for the terminal device again. This prevents the network device and the terminal device from entering an infinite loop of cyclic reconfiguration.

Optionally, the second capability report message carries information about a plurality of frequency bands supported by the terminal device, and indicates that the terminal device does not support the carrier aggregation capability.

It may be understood that when the terminal device is handed over to another network device or another cell of the current network device, after sending an attach request message to the another cell for the first time, the terminal device may send the first capability report message. When the terminal device is handed over back to the first cell from another cell, the terminal device may send the foregoing capability report message.

The reconfiguration method provided in this embodiment of this application includes: When the terminal device performs reconfiguration based on a received reconfiguration request message for a plurality of consecutive times but fails in the reconfiguration, the terminal device detaches from the network device, and resends an attach request message to the network device. The carrier aggregation capability of the terminal device is disabled in a capability report message that is sent in the reattaching process. When a plurality of reconfiguration failures are detected, reattaching is performed, and carrier aggregation of the terminal device is disabled, so that an infinite loop of reconfiguration can be ended, and communication of the terminal device is not affected.

For example, this embodiment may be performed independently, or may be combined with Embodiment 1. For example, Embodiment 1 may be performed first, and then Embodiment 2 is performed. N in Embodiment 1 may be the same as or different from M in Embodiment 2.

Figure 6:
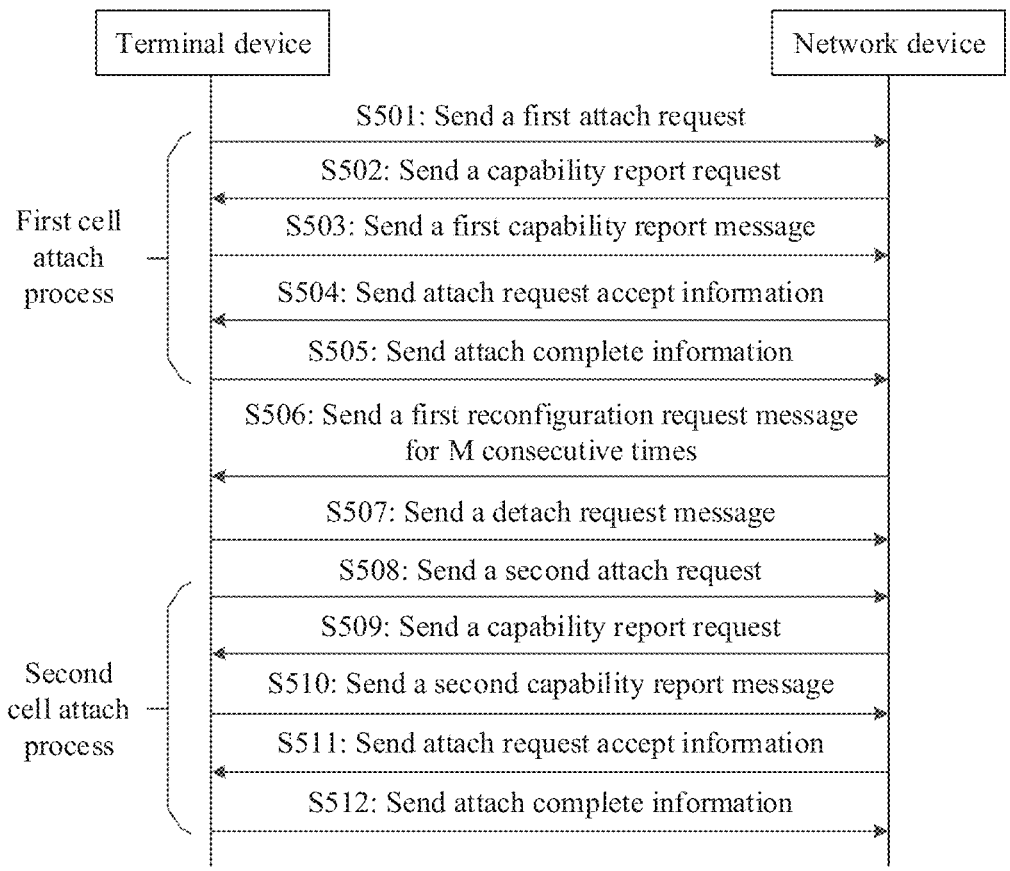
FIG. 6 is a schematic signaling flowchart 2 of a reconfiguration method according to an embodiment of this application.

FIG. 6 is a schematic signaling flowchart 2 of a reconfiguration method according to an embodiment of this application. This embodiment describes an example of a signaling procedure in the reconfiguration method shown in FIG. 5. As shown in FIG. 6, the reconfiguration method includes the following steps.

S501: A terminal device sends a first attach request to a network device.

S502: The network device sends a capability report request to the terminal device.

S503: The terminal device sends a first capability report message to the network device.

S504: The network device sends attach request accept information to the terminal device.

S505: The terminal device sends attach complete information to the network device.

S506: The network device sends a first reconfiguration request message to the terminal device for M consecutive times.

S507: The terminal device sends a detach request message to the network device.

S508: The terminal device sends a second attach request to the network device.

S509: The network device sends a capability report request to the terminal device.

S510: The terminal device sends a second capability report message to the network device.

For example, different from the embodiment shown in FIG. 4, in this embodiment, a carrier aggregation capability of the terminal device is disabled in the second capability report message. In this case, when the network device sends the reconfiguration request message to the terminal device, the network device cannot configure a secondary cell for the terminal device by using the reconfiguration request message.

S511: The network device sends attach request accept information to the terminal device.

S512: The terminal device sends attach complete information to the network device.

S501 to S509, S511, and S512 in this embodiment are the same as S301 to S309, S311, and S312 in the embodiment shown in FIG. 4, and details are not described again in this application.

Embodiment 3

Figure 7:
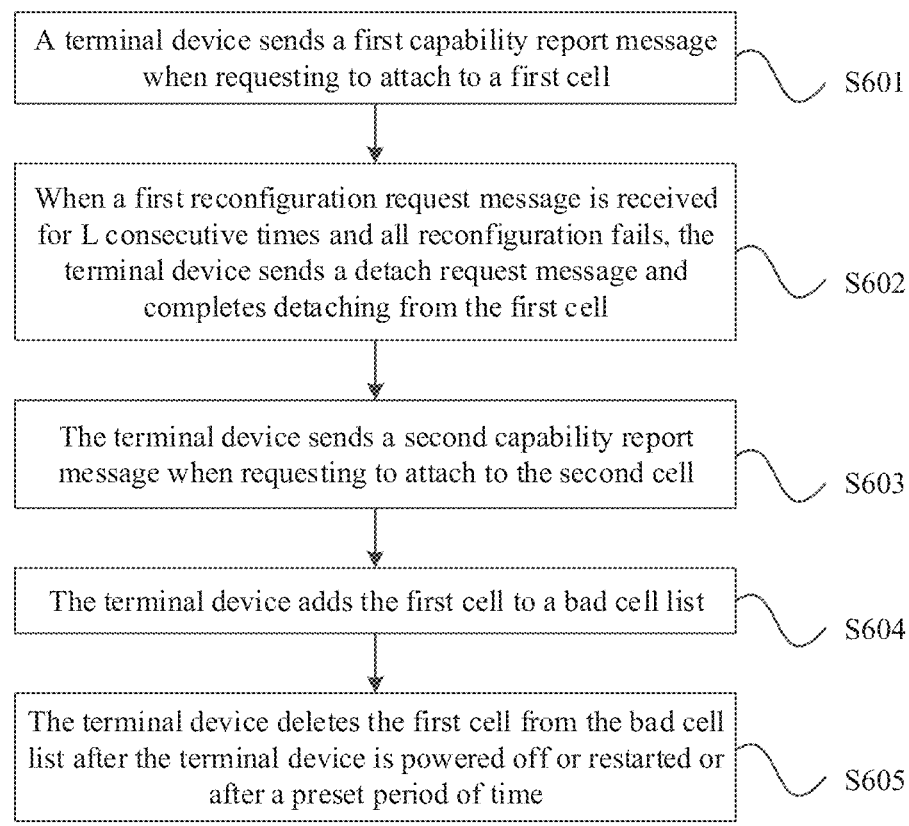
FIG. 7 is a schematic flowchart 3 of a reconfiguration method according to an embodiment of this application.

Still another aspect of this application provides a reconfiguration method. FIG. 7 is a schematic flowchart 3 of a reconfiguration method according to an embodiment of this application. This embodiment may be performed by the terminal device in the communications system shown in FIG. 1. In this embodiment, when detecting reconfiguration for a plurality of times, the terminal device detaches from a current first cell, and attaches to a second cell instead, to ensure communication of the terminal device. As shown in FIG. 7, the reconfiguration method provided in this embodiment of this application includes the following steps.

S601: The terminal device sends a first capability report message when requesting to attach to the first cell.

S602: When a first reconfiguration request message is received for L consecutive times and all reconfiguration fails, the terminal device sends a detach request message and completes detaching from the first cell.

L is a positive integer, and the first reconfiguration request message in this embodiment is used to indicate, to the terminal device, a frequency of a secondary cell in which carrier aggregation is performed or a frequency of a cell to which the terminal device is handed over.

For example, S601 and S602 in this embodiment are similar to S201 and S202 in the embodiment shown in FIG. 3, and details are not described again in this application.

For example, the first reconfiguration request message may be used to indicate, to the terminal device, the frequency of the cell to which the terminal device is handed over. The network device may deliver a cell migration indication to the terminal device based on capability information reported by the terminal device and a load status of the cell in which the terminal device is located, to improve communication efficiency.

For example, when there are too many currently attached users in the first cell in which the terminal device is located, the network device may deliver an RRC connection reconfiguration message to the terminal device, to indicate the terminal device to migrate to a neighboring cell. The RRC connection reconfiguration message carries frequency information of the cell to which the terminal device migrates, and a frequency indicated by the frequency information falls within a frequency range corresponding to a frequency band indicated in a capability reporting process of the terminal device.

S603: The terminal device sends a second capability report message when requesting to attach to the second cell.

The second cell and the first cell are different cells, and the second capability report message indicates a frequency band support capability of the terminal device.

Optionally, the frequency band support capability of the terminal device indicated by the second capability report message in this embodiment may be the same as the frequency band support capability of the terminal device indicated by the first capability report message in S601, and may also be the same as the frequency band support capability of the terminal device indicated in the second capability report message in the embodiment shown in FIG. 3 or FIG. 5.

For example, when the terminal device attaches to the second cell, as shown in FIG. 6, the reconfiguration method provided in this embodiment may further include the following step:

S604: The terminal device adds the first cell to a bad cell list.

A cell in the bad cell list is a cell to which the terminal device is forbidden to attach.

For example, the bad cell list is set, and the first cell is added to the bad cell list, so that reconnecting to a bad cell can be avoided, and the network device further avoids reconfiguring, for the terminal device, a frequency that is not supported by the terminal device, so that communication of the terminal device is not affected.

Further, after the terminal device adds the first cell to the bad cell list, the reconfiguration method further includes the following step:

S605: The terminal device deletes the first cell from the bad cell list after the terminal device is powered off or restarted or after a preset period of time.

For example, when adding the first cell to the bad cell list, the terminal device starts a timer, and records time for adding the first cell to the bad cell list. The terminal device may delete the first cell from the bad cell list after the preset period of time. For example, the terminal device may alternatively delete the first cell from the bad cell list after the terminal device is powered off or restarted.

For example, after the terminal device is consecutively handed over to a cell for K times, the terminal device does not change the attached cell. This can prevent the network device from repeatedly reconfiguring an invalid cell. K is a positive integer.

The reconfiguration method provided in this embodiment of this application includes: When the terminal device performs reconfiguration based on a received reconfiguration request message for a plurality of consecutive times but fails in the reconfiguration, the terminal device detaches from the network device, and resends an attach request message to the network device, so that the terminal device attaches to a different cell. When a plurality of reconfiguration failures are detected, the terminal device is attached to a different cell, so that an infinite loop of reconfiguration can be ended, and communication of the terminal device is not affected.

For example, this embodiment may be independently executed, or may be combined with each of Embodiment 1 and Embodiment 2 or combined with both Embodiment 1 and Embodiment 2. For example, Embodiment 1 may be performed first, then Embodiment 2 is performed, and finally Embodiment 3 is performed. For example, alternatively, Embodiment 2 may be performed first, and then Embodiment 3 is performed. N in Embodiment 1, M in Embodiment 2, and L in Embodiment 3 may be the same or may be different.

Figure 8:
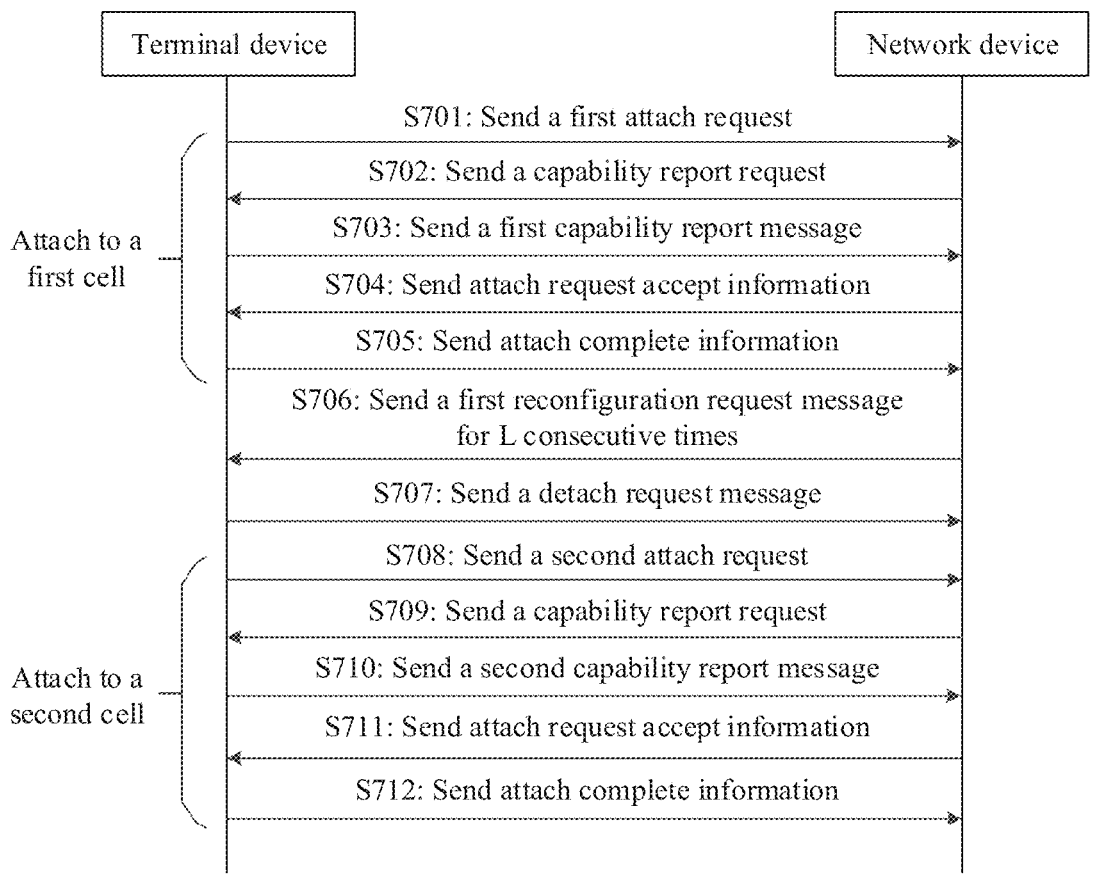
FIG. 8 is a schematic signaling flowchart 3 of a reconfiguration method according to an embodiment of this application.

FIG. 8 is a schematic signaling flowchart 3 of a reconfiguration method according to an embodiment of this application. This embodiment describes an example of a signaling procedure in the reconfiguration method shown in FIG. 7. As shown in FIG. 8, the reconfiguration method includes the following steps.

S701: A terminal device sends a first attach request to a network device.

S702: The network device sends a capability report request to the terminal device.

S703: The terminal device sends a first capability report message to the network device.

S704: The network device sends attach request accept information to the terminal device.

S705: The terminal device sends attach complete information to the network device.

S706: The network device sends a first reconfiguration request message to the terminal device for L consecutive times.

S707: The terminal device sends a detach request message to the network device.

S708: The terminal device sends a second attach request to the network device.

Different from the embodiments shown in FIG. 4 and FIG. 6, in this embodiment, the network device attaches, based on the second attach request, the terminal device to a second cell different from the first cell.

S709: The network device sends a capability report request to the terminal device.

S710: The terminal device sends a second capability report message to the network device.

In this embodiment, the second capability report message may be the same as the first capability report message in S703, or may be the same as the second capability report message in the embodiment shown in FIG. 4 and the second capability report message in the embodiment shown in FIG. 6.

S711: The network device sends attach request accept information to the terminal device.

S712: The terminal device sends attach complete information to the network device.

S701 to S707, S711, and S712 in this embodiment are the same as S301 to S307, S311, and S312 in the embodiment shown in FIG. 4, and details are not described again in this application.

Embodiment 4

Figure 9:
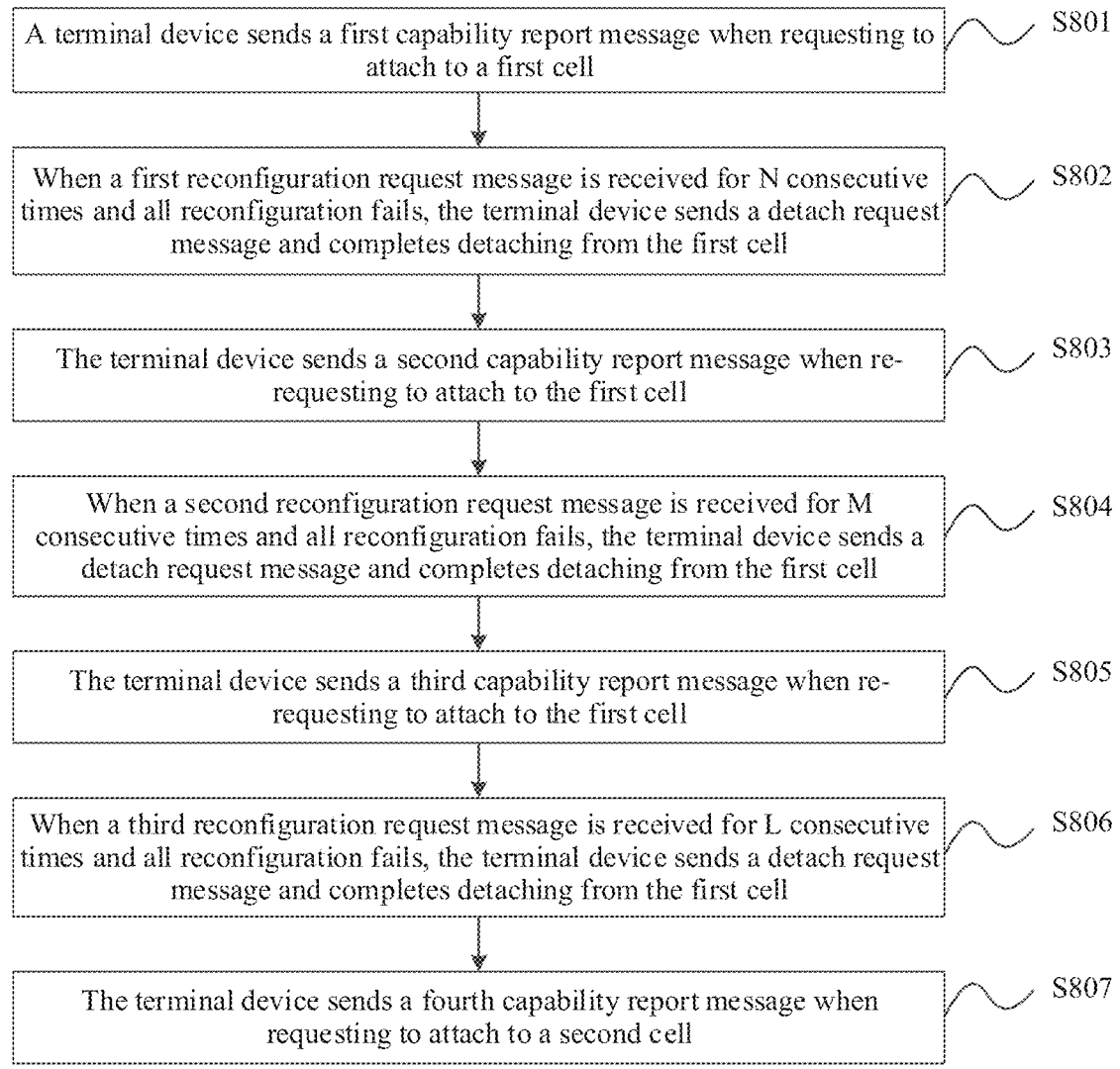
FIG. 9 is a schematic flowchart 4 of a reconfiguration method according to an embodiment of this application.

Yet another aspect of this application provides a reconfiguration method. FIG. 9 is a schematic flowchart 4 of a reconfiguration method according to an embodiment of this application. This embodiment may be performed by the terminal device in the communications system shown in FIG. 1. A combination of the reconfiguration methods in the foregoing three embodiments is described in detail in this embodiment. As shown in FIG. 9, the reconfiguration method provided in this embodiment of this application includes the following steps.

S801: The terminal device sends a first capability report message when requesting to attach to a first cell.

The first capability report message indicates that a frequency band support capability of the terminal device is that the terminal device supports a band X, a band Y, a band Z, and a band W. The first capability report message indicates that a carrier aggregation capability of the terminal device is that the terminal device supports carrier aggregation in a combination of any two of the band X, the band Y, the band Z, and the band W.

S802: When a first reconfiguration request message is received for N consecutive times and all reconfiguration fails, the terminal device sends a detach request message and completes detaching from the first cell.

In the first reconfiguration request message, a frequency in the band Y is configured for the terminal device as a frequency of a secondary cell of the terminal device, but the frequency in the band Y is a frequency that is not supported by the terminal device.

S803: The terminal device sends a second capability report message when re-requesting to attach to the first cell.

A carrier aggregation capability of the terminal device in a combination of the band X and the band Y may be disabled in the second capability report message. Alternatively, a carrier aggregation capability of the terminal device in the band Y may be disabled in the second capability report message. For example, carrier aggregation capabilities of the terminal device in a combination of the band Y and the band X, a combination of the band Y and the band Z, and a combination of the band Y and the band W are disabled. Alternatively, a carrier aggregation capability of the terminal device in the band X may be disabled in the second capability report message. For example, carrier aggregation capabilities of the terminal device in a combination of the band X and the band Y, a combination of the band X and the band Z, and a combination of the band X and the band W are disabled.

S804: When a second reconfiguration request message is received for M consecutive times and all reconfiguration fails, the terminal device sends a detach request message and completes detaching from the first cell.

In the second reconfiguration request message, a frequency in the band Z is configured for the terminal device as a frequency of a secondary cell of the terminal device, but the frequency in the band Z is still a frequency that is not supported by the terminal device.

S805: The terminal device sends a third capability report message when re-requesting to attach to the first cell.

In this case, carrier aggregation capabilities of the terminal device in all frequency bands are disabled in the third capability report message.

S806: When a third reconfiguration request message is received for L consecutive times and all reconfiguration fails, the terminal device sends a detach request message and completes detaching from the first cell.

In the third reconfiguration request message, a frequency in the band W may be configured for the terminal device as a frequency of a secondary cell of the terminal device, or a frequency in all supported frequency bands is configured for the terminal device to perform cell handover. However, the frequency in the third reconfiguration request message is still a frequency that is not supported by the terminal device.

S807: The terminal device sends a fourth capability report message when requesting to attach to a second cell.

The second cell and the first cell are different cells, and the fourth capability report message indicates a frequency band support capability of the terminal device. The fourth capability report message may be the same as any one of the first capability report message, the second capability report message, and the third capability report message in this embodiment.

For example, in this embodiment, the terminal device first attaches to the first cell of the network device. When the network device configures the secondary cell for the terminal device, a frequency of the secondary cell may not fall within a frequency band range supported by the terminal device. In this case, the terminal device enters cyclic reconfiguration. When the terminal device detects that the reconfiguration fails for N consecutive times, the terminal device detaches from the first cell, and reattaches to the first cell. In this case, a carrier aggregation capability in a frequency band in which the frequency of the secondary cell is located is disabled during capability reporting by the terminal device, so that the network device allocates another frequency during reconfiguration.

When the another frequency allocated by the network device is still not within the frequency band range supported by the terminal device, the terminal device enters cyclic reconfiguration again. When the terminal device detects that the reconfiguration fails for M consecutive times, the terminal device detaches from the first cell, and reattaches to the first cell. In this case, all carrier aggregation capabilities are further disabled during capability reporting by the terminal device, so that the network device stops allocating a secondary cell to the terminal device. Alternatively, the terminal device is handed over to a cell.

When the network device sends RRC connection reconfiguration information to the terminal device to hand over a cell for the terminal device, if it is detected that the frequency of the cell to which the terminal device is handed over is still not within the frequency band range supported by the terminal device, the terminal device enters cyclic reconfiguration again. When the terminal device detects that the reconfiguration fails for L consecutive times, the terminal device detaches from the first cell, and reattaches to the second cell, where the second cell is another cell different from the first cell. In this case, in capabilities reported by the terminal device to the network device, the previously disabled carrier aggregation capability may be restored, or all carrier aggregation capabilities of the terminal device may be restored.

Based on the foregoing embodiment, the terminal device further receives a first indication message sent by the network device or receives a first indication message entered by a user, where the first indication message is used to indicate to start the reconfiguration method in this embodiment of this application. When the terminal device does not start the reconfiguration method in this embodiment of this application, the terminal device may receive a reconfiguration request message, and the reconfiguration request message indicates a frequency that is not supported by the terminal device. Regardless of whether the reconfiguration request message indicates a scenario with measurement or a scenario without measurement, the terminal device ignores the reconfiguration request message, and performs no action. In this case, the terminal device may still communicate with the network device at a relatively low rate.

The embodiments of this application further provide a reconfiguration apparatus. The reconfiguration apparatus may be used as a terminal device to perform actions performed by the terminal device in the method embodiments shown in FIG. 3 and FIG. 9, and has a same or similar technical feature and technical effect.

Figure 10:
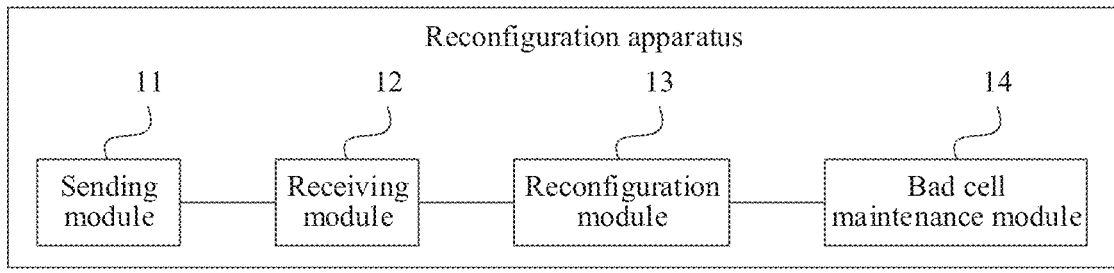
FIG. 10 is a schematic structural diagram of a reconfiguration apparatus according to an embodiment of this application.

FIG. 10 is a schematic structural diagram of a reconfiguration apparatus according to an embodiment of this application. As shown in FIG. 10, the reconfiguration apparatus may be a terminal device, or may be a module in a terminal device, for example, a chip in the terminal device. The reconfiguration apparatus includes:

a sending module 11, configured to send a first capability report message when the terminal device requests to attach to a first cell, where the first capability report message indicates a frequency band support capability and a carrier aggregation capability of the terminal device;

a receiving module 12, configured to receive a first reconfiguration request message; and a reconfiguration module 13, configured to perform reconfiguration based on the received first reconfiguration request message.

The sending module 11 is further configured to: when the reconfiguration module 13 fails to perform reconfiguration for N consecutive times, send a detach request message and complete detaching from the first cell, where a first reconfiguration request message is used to indicate, to the terminal device, a frequency of a secondary cell in which carrier aggregation is performed, and N is a positive integer.

The sending module 11 is further configured to send a second capability report message when the terminal device re-requests to attach to the first cell, where a first carrier aggregation capability of the terminal device is disabled in the second capability report message, and the first carrier aggregation capability includes a carrier aggregation capability in at least one of the following combinations:

a combination of a frequency band of the first cell and a frequency band in which the frequency is located; or all combinations including a frequency band of the first cell; or all combinations including a frequency band in which the frequency is located.

Some embodiments, the sending module 11 is further configured to: after the sending module sends the second capability report message, when the reconfiguration module 13 fails to perform reconfiguration for M consecutive times, send a detach request message and complete detaching from the first cell, where a second reconfiguration request message is used to indicate, to the terminal device, a frequency of a secondary cell in which carrier aggregation is performed, and M is a positive integer; and the sending module 11 is further configured to send a third capability report message when the terminal device re-requests to attach to the first cell, where carrier aggregation capabilities of the terminal device in all bands are disabled in the third capability report message.

In some embodiments, the sending module 11 is further configured to: after the sending module sends the second capability report message, when the reconfiguration module 13 fails to perform reconfiguration for L consecutive times, send a detach request message and complete detaching from the first cell, where a third reconfiguration request message is used to indicate, to the terminal device, a frequency of a secondary cell in which carrier aggregation is performed or a frequency of a cell to which the terminal device is handed over, and L is a positive integer; and the sending module 11 is further configured to send a fourth capability report message when the terminal device requests to attach to a second cell, where the second cell is a cell different from the first cell, and the fourth capability report message indicates a frequency band support capability of the terminal device.

In some embodiments, referring to FIG. 10, the reconfiguration apparatus further includes:

a bad cell maintenance module 14, configured to add the first cell to a bad cell list, where a cell in the bad cell list is a cell to which the terminal device is forbidden to attach.

In a possible design, the bad cell maintenance module 14 is further configured to delete the first cell from the bad cell list after the terminal device is powered off or restarted or after a preset period of time.

The embodiments of this application further provide a reconfiguration apparatus. The reconfiguration apparatus may be used as a terminal device to perform actions performed by the terminal device in the method embodiments shown in FIG. 5 and FIG. 8, and has a same or similar technical feature and technical effect.

In some embodiments, referring to FIG. 10, the sending module 11 is configured to send a first capability report message when the terminal device requests to attach to a first cell, where the first capability report message indicates a frequency band support capability and a carrier aggregation capability of the terminal device.

The receiving module 12 is configured to receive a first reconfiguration request message.

The reconfiguration module 13 is configured to perform reconfiguration based on the received first reconfiguration request message.

The sending module 11 is further configured to: when the reconfiguration module 13 fails to perform reconfiguration for N consecutive times, send a detach request message and complete detaching from the first cell, where a first reconfiguration request message is used to indicate, to the terminal device, a frequency of a secondary cell in which carrier aggregation is performed, and N is a positive integer.

The sending module 11 is further configured to send a second capability report message when the terminal device re-requests to attach to the first cell, where carrier aggregation capabilities of the terminal device in all bands are disabled in the second capability report message.

In a possible design, the sending module 11 is further configured to: when the reconfiguration module 13 fails to perform reconfiguration for M consecutive times, send a detach request message and complete detaching from the first cell, where a second reconfiguration request message is used to indicate, to the terminal device, a frequency of a secondary cell in which carrier aggregation is performed or a frequency of a cell to which the terminal device is handed over, and M is a positive integer; and the sending module 11 is further configured to send a third capability report message when the terminal device requests to attach to a second cell, where the second cell is a cell different from the first cell, and the third capability report message indicates a frequency band support capability of the terminal device.

In some embodiments, referring to FIG. 10, the reconfiguration apparatus further includes:

a bad cell maintenance module 14, configured to add the first cell to a bad cell list, where a cell in the bad cell list is a cell to which the terminal device is forbidden to attach.

In some embodiments, the bad cell maintenance module 14 is further configured to delete the first cell from the bad cell list after the terminal device is powered off or restarted or after a preset period of time.

The embodiments of this application further provide a reconfiguration apparatus. The reconfiguration apparatus may be used as a terminal device to perform actions performed by the terminal device in the method embodiments shown in FIG. 7 and FIG. 8, and has a same or similar technical feature and technical effect.

In some embodiments, referring to FIG. 10, the sending module 11 is configured to send a first capability report message when the terminal device requests to attach to a first cell, where the first capability report message indicates a frequency band support capability and a carrier aggregation capability of the terminal device.

The receiving module 12 is configured to receive a first reconfiguration request message.

The reconfiguration module 13 is configured to perform reconfiguration based on the received first reconfiguration request message.

The sending module 11 is further configured to: when the reconfiguration module 13 fails to perform reconfiguration for N consecutive times, send a detach request message and complete detaching from the first cell, where a reconfiguration request message is used to indicate, to the terminal device, a frequency of a secondary cell in which carrier aggregation is performed or a frequency of a cell to which the terminal device is handed over, and N is a positive integer.

The sending module 11 is further configured to send a second capability report message when the terminal device requests to attach to a second cell, where the second cell is a cell different from the first cell, and the second capability report message indicates a frequency band support capability and a carrier aggregation capability of the terminal device.

In some embodiments, referring to FIG. 10, the reconfiguration apparatus further includes:
- a bad cell maintenance module 14, configured to add the first cell to a bad cell list, where a cell in the bad cell list is a cell to which the terminal device is forbidden to attach.

In some embodiments, the bad cell maintenance module 14 is further configured to delete the first cell from the bad cell list after the terminal device is powered off or restarted or after a preset period of time.

It should be understood that the sending module 11 may be a transmitter in actual implementation, and the receiving module 12 may be a transceiver, which may further include a transmitter and a receiver in actual implementation. Another module may be implemented in a form of software invoked by a processing element, or may be implemented in a form of hardware. For example, the reconfiguration module 13 and the bad cell maintenance module 14 may be separately disposed processing elements, or may be integrated into a chip of the foregoing apparatus for implementation. In addition, the reconfiguration module 13 and the bad cell maintenance module 14 may be stored in a memory of the foregoing apparatus in a form of program code, and are invoked by a processing element of the foregoing apparatus to perform a function of the processing module. In addition, all or some of the modules may be integrated together, or may be implemented independently. The processing element may be an integrated circuit and has a signal processing capability. In an implementation process, steps in the foregoing methods or the foregoing modules may be completed by using a hardware integrated logical circuit in the processor element, or by using instructions in a form of software.

For example, the foregoing modules may be configured as one or more integrated circuits for implementing the foregoing method, such as one or more application specific integrated circuits (ASIC), one or more microprocessors (DSP), or one or more field programmable gate arrays (FPGA). For another example, when one of the foregoing modules is implemented in a form of scheduling program code by the processing element, the processing element may be a general-purpose processor, for example, a central processing unit (CPU) or another processor that can invoke the program code. For still another example, these modules may be integrated together and implemented in a form of a system-on-a-chip (SOC).

Figure 11:
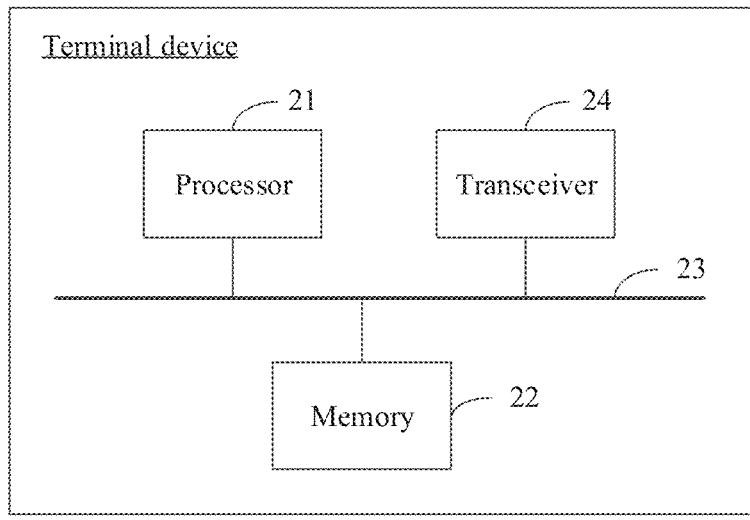
FIG. 11 is a schematic structural diagram of a terminal device according to an embodiment of this application.

FIG. 11 is a schematic structural diagram of a terminal device according to an embodiment of this application. As shown in FIG. 11, the terminal device includes a processor 21 and a memory 22.

The memory 22 is configured to store a computer program.

The processor 21 is configured to execute the computer program stored in the memory, to implement the methods performed by the terminal in FIG. 3 to FIG. 9. For details, refer to the related descriptions in the foregoing method embodiments.

Optionally, the memory 22 may be independent, or may be integrated with the processor 21.

When the memory 22 is a component independent of the processor 21, the terminal device may further include:
- a bus 23, configured to connect the memory 22 and the processor 21. The communications device may further include a transceiver 24, configured to communicate with a network device, for example, receive a reconfiguration request message sent by the network device, and send an attach request message or a capability report message to the network device.

The embodiments of this application further provide a communications system. The communications system may include a network device and a terminal device in the communications system shown in FIG. 1. The network device and the terminal device each perform actions performed by the terminal device and the network device in the method embodiments shown in FIG. 3 to FIG. 9, and have a same or similar technical feature and technical effect. For details, refer to the related descriptions in the foregoing method embodiments.

The embodiments of this application provide a storage medium. The storage medium includes a computer program, and the computer program is used to implement the methods performed by the terminal device in FIG. 3 to FIG. 9.

The embodiments of this application provide a computer program product. The computer program product includes computer program code, and when the computer program code is run on a computer, the computer is enabled to perform the methods performed by the terminal device in FIG. 3 to FIG. 9.

The embodiments of this application provide a chip, including a memory and a processor. The memory is configured to store a computer program, and the processor is configured to invoke and run the computer program from the memory, so that the processor performs the methods performed by the terminal device in FIG. 3 to FIG. 9.

Figure 12:
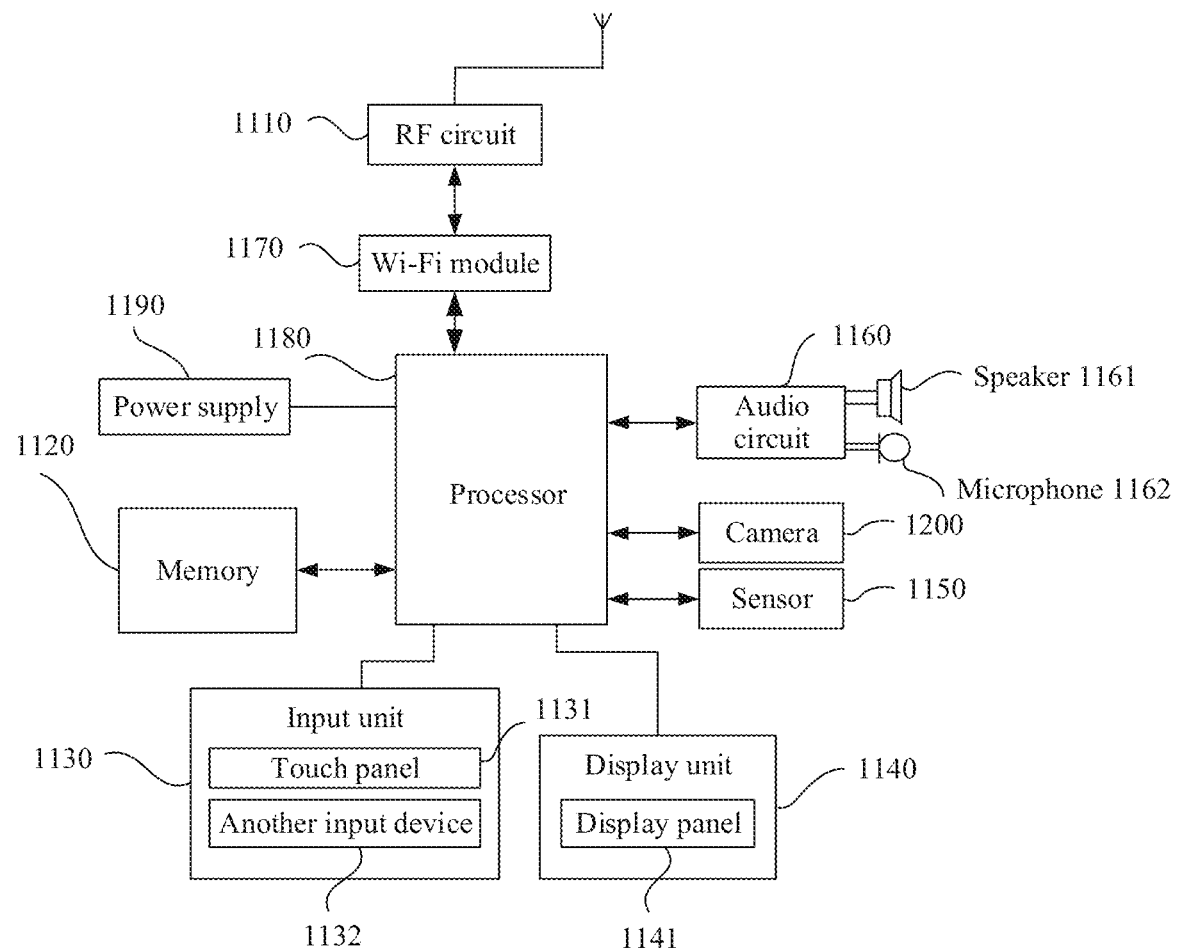
FIG. 12 is a schematic structural diagram of a mobile phone according to an embodiment of this application.

As described in the foregoing embodiments, the terminal device in this embodiment may be a device that has a photographing function, such as a mobile phone, a tablet computer, or a PDA. An example in which the terminal device is a mobile phone is used. FIG. 12 is a schematic structural diagram of a mobile phone according to an embodiment of this application. Referring to FIG. 12, the mobile phone includes components such as a radio frequency (Radio Frequency, RF) circuit 1110, a memory 1120, an input unit 1130, a display unit 1140, a sensor 1150, an audio circuit 1160, a wireless fidelity (wireless fidelity, Wi-Fi) module 1170, a processor 1180, and a power supply 1190. A person skilled in the art may understand that a structure of the mobile phone shown in FIG. 12 constitutes no limitation on the mobile phone, and the mobile phone may include more or fewer components than those shown in the figure, or some components may be combined, or different component deployments may be used.

The following describes the components of the mobile phone in detail with reference to FIG. 16.

The RF circuit 1110 may be configured to: receive and send a signal in an information receiving and sending process or a call process; and in particular, after receiving downlink information of a base station, send the downlink information to the processor 1180 for processing; in addition, send uplink data to the base station. Usually, the RF circuit includes but is not limited to an antenna, at least one amplifier, a transceiver, a coupler, a low noise amplifier (LNA), a duplexer, and the like. In addition, the RF circuit 1110 may further communicate with a network and another device through wireless communication. The wireless communication may use any communications standard or protocol, including but not limited to global system for mobile communications (GSM), a general packet radio service (GPRS), code division multiple access (CDMA), wideband code division multiple access (WCDMA), long term evolution (LTE), an e-mail message, a short message service (SMS), and the like.

The memory 1120 may be configured to store a software program and a module. The processor 1180 executes various function applications of the mobile phone and data by running the software program and the module that are stored in the memory 1120. The memory 1120 may mainly include a program storage area and a data storage area. The program storage area may store an operating system, an application required by at least one function (such as a voice play function and an image play function), and the like. The data storage area may store data (such as audio data and a phone book) that is created based on use of the mobile phone, and the like. In addition, the memory 1120 may include a high-speed random access memory, and may further include a nonvolatile memory such as at least one magnetic disk storage device and a flash memory device, or another volatile solid-state storage device.

The input unit 1130 may be configured to: receive entered digit or character information, and generate key-signal input related to user setting and function control of the mobile phone 1100. For example, the input unit 1130 may include a touch panel 1131 and another input device 1132. The touch panel 1131, also referred to as a touchscreen, may collect a touch operation (for example, an operation performed by a user on or near the touch panel 1131 by using any suitable object or accessory such as a finger or a stylus) performed by the user on or near the touch panel 1131, and may drive a corresponding connection apparatus based on a preset program. Optionally, the touch panel 1131 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch point coordinates, sends the touch point coordinates to the processor 1180, and receives and executes a command sent by the processor 1180. In addition, the touch panel 1131 may be implemented in a plurality of types, such as a resistive type, a capacitive type, an infrared type, and a surface acoustic wave type. The input unit 1130 may further include the another input device 1132 in addition to the touch panel 1131. For example, the another input device 1132 may include but is not limited to one or more of a physical keyboard, a function button (such as a volume control button or a power button), a trackball, a mouse, a joystick, and the like.

The display unit 1140 may be configured to display information entered by a user or information provided for the user, and various menus of the mobile phone. The display unit 1140 may include a display panel 1141. Optionally, the display panel 1141 may be configured in a form of a liquid crystal display (LCD), an organic light-emitting diode (OLED), or the like. Further, the touch panel 1131 may cover the display panel 1141. When detecting the touch operation on or near the touch panel 1131, the touch panel 1131 transmits the touch operation to the processor 1180 to determine a type of a touch event, and then the processor 1180 provides a corresponding visual output on the display panel 1141 based on the type of the touch event. Although, in FIG. 16, the touch panel 1131 and the display panel 1141 are used as two independent components to implement input and output functions of the mobile phone, in some embodiments, the touch panel 1131 and the display panel 1141 may be integrated to implement the input and output functions of the mobile phone.

The mobile phone may further include at least one sensor 1150, such as an optic sensor, a movement sensor, and another sensor. For example, the light sensor may include an ambient light sensor and a proximity sensor. The ambient light sensor may adjust luminance of the display panel 1141 based on brightness of ambient light, and when the mobile phone approaches an ear, the light sensor may turn off the display panel 1141 and/or backlight. As a type of motion sensor, an acceleration sensor may detect values of acceleration in directions (usually three axes), may detect, in a static state, a value and a direction of gravity, and may be used for an application that identifies a posture (such as screen switching between a landscape mode and a portrait mode, a related game, and magnetometer posture calibration) of the mobile phone, a vibration-identification-related function (such as a pedometer and tapping), and the like. Other sensors that can be configured on the mobile phone such as a gyroscope, a barometer, a hygrometer, a thermometer, and an infrared sensor are not described herein.

The audio circuit 1160, a speaker 1161, and a microphone 1162 may provide an audio interface between the user and the mobile phone. The audio circuit 1160 may convert received audio data into an electrical signal, and then transmit the electrical signal to the speaker 1161, and the speaker 1161 converts the electrical signal into a sound signal for output. In addition, the microphone 1162 converts a collected sound signal into an electrical signal. The audio circuit 1160 receives the electrical signal, converts the electrical signal into audio data, and then outputs the audio data to the processor 1180 for processing. After the processing, the processor 1180 sends the audio data to, for example, another mobile phone through the RF circuit 1110, or outputs the audio data to the memory 1120 for further processing.

Wi-Fi belongs to a short-distance wireless transmission technology. The mobile phone may help, by using the Wi-Fi module 1170, the user receive and send an email, browse a web page, access streaming media, and the like. The Wi-Fi module 1170 provides wireless broadband internet access for the user. Although FIG. 16 shows the Wi-Fi module 1170, it may be understood that the Wi-Fi module 1170 is not a mandatory component of the mobile phone, and may be omitted.

The processor 1180 is a control center of the mobile phone, connects various components of the entire mobile phone through various interfaces and lines, and executes various functions and data of the mobile phone by running or executing the software program and/or the module stored in the memory 1120 and invoking data stored in the memory 1120, to perform overall monitoring on the mobile phone. Optionally, the processor 1180 may include one or more processing units. Preferably, an application processor and a modem processor may be integrated into the processor 1180. The application processor mainly processes an operating system, a user interface, an application, and the like. The modem processor mainly processes wireless communication. It may be understood that the modem processor may alternatively not be integrated into the processor 1180.

The mobile phone further includes the power supply 1190 (such as a battery) supplying power to the components. Preferably, the power supply may be logically connected to the processor 1180 by using a power management system, to implement functions such as management of charging, discharging, and power consumption by using the power management system.

The mobile phone may further include a camera 1200. The camera may be a front-facing camera or a rear-facing camera.

Although not shown, the mobile phone may further include a Bluetooth module, a GPS module, and the like. Details are not described herein.

It should be understood that, although terms such as "first", "second", and "third" may be used to describe cells in the embodiments of this application, the cells should not be limited to these terms. The terms are merely used to distinguish the cells from each other. For example, without departing from the scope of the embodiments of this application, a first cell may also be referred to as a second cell. Likewise, a second cell may also be referred to as a first cell.

It should be understood that, although terms such as "first", "second", and "third" may be used to describe reconfiguration request messages in the embodiments of this application, the reconfiguration request messages should not be limited to these terms. These terms are used only to distinguish reconfiguration request messages from each other. For example, without departing from the scope of this embodiment of this application, a first reconfiguration request message may also be referred to as a second reconfiguration request message. Likewise, a second reconfiguration request message may also be referred to as a first reconfiguration request message.

It should be understood that, although terms such as "first", "second", and "third" may be used to describe capability report messages in the embodiments of this application, the capability report messages should not be limited to these terms. These terms are used only to distinguish capability report messages from each other. For example, without departing from the scope of this embodiment of this application, a first capability report message may also be referred to as a second capability report message. Likewise, a second capability report message may also be referred to as a first capability report message.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The term "a plurality of" in this specification refers to two or more than two. The term "and/or" in this specification describes only an association relationship for describing associated objects and indicates that there may be three relationships. For example, A and/or B may represent the following three cases: Only A exists, both A and B exist, and only B exists. In addition, the character "/" in this specification usually indicates an "or" relationship between the associated objects. In the formula, the character "/" indicates a "division" relationship between the associated objects.

It may be understood that various numbers in the embodiments of this application are merely used for differentiation for ease of description, and are not used to limit the scope of the embodiments of this application.

It may be understood that in the embodiments of this application, sequence numbers of the foregoing processes do not mean execution sequences. The execution sequences of the processes should be determined based on functions and internal logic of the processes, and should not be construed as any limitation on the implementation processes of the embodiments of this application. The term "and/or" in this specification describes only an association relationship for describing associated objects and indicates that there may be three relationships. For example, A and/or B may represent the following three cases: Only A exists, both A and B exist, and only B exists. In addition, the character "/" in this specification usually indicates an "or" relationship between the associated objects.

It should be understood that, in various embodiments of this application, sequence numbers of the foregoing processes do not mean execution sequences. The execution sequences of the processes should be determined based on functions and internal logic of the processes, and should not be construed as any limitation on the implementation processes of the discussed embodiments.

A person of ordinary skill in the art may be aware that, in combination with the examples described in the embodiments disclosed in this specification, units and algorithm steps may be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that, the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or partially contribute to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes various media that can store program code, such as a USB flash drive, a removable hard disk, a read-only memory (ROM), a random access memory (RAM), a magnetic disk, and an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal device, comprising a memory, a processor, and a transceiver, wherein
    the transceiver is configured to send a first capability report message when the terminal device requests to attach to a first cell, wherein the first capability report message indicates a frequency band support capability and a carrier aggregation capability of the terminal device;
    when the processor determines that a first reconfiguration request message is received for N consecutive times and all reconfigurations fail, the transceiver is further configured to send a detach request message and complete detaching from the first cell, wherein the first reconfiguration request message is used to indicate, to the terminal device, a frequency of a secondary cell in which carrier aggregation is performed, and N is a positive integer; and
    the transceiver is further configured to send a second capability report message when the terminal device re-requests to attach to the first cell, wherein a first carrier aggregation capability of the terminal device is disabled in the second capability report message, and the first carrier aggregation capability comprises the carrier aggregation capability of the terminal device in a combination of a frequency band of the first cell and a frequency band in which the frequency of the secondary cell is located.

2. The device according to claim 1, wherein when the processor determines that a second reconfiguration request message is received for M consecutive times and all reconfigurations fail, the transceiver is further configured to send the detach request message and complete detaching from the first cell, wherein the second reconfiguration request message is used to indicate, to the terminal device, the frequency of the secondary cell in which the carrier aggregation is performed, and M is a positive integer; and
    the transceiver is further configured to send a third capability report message when the terminal device re-requests to attach to the first cell, wherein the carrier aggregation capabilities of the terminal device in all bands are disabled in the third capability report message.

3. The device according to claim 1, wherein when the processor determines that a third reconfiguration request message is received for L consecutive times and all reconfigurations fail, the transceiver is further configured to send the detach request message and complete detaching from the first cell, wherein the third reconfiguration request message is used to indicate, to the terminal device, the frequency of the secondary cell in which the carrier aggregation is performed or a frequency of a cell to which the terminal device is handed over, and L is a positive integer; and
    the transceiver is further configured to send a fourth capability report message when the terminal device requests to attach to a second cell, wherein the second cell is different from the first cell, and the fourth capability report message indicates the frequency band support capability of the terminal device.

4. The device according to claim 3, wherein the processor is further configured to add the first cell to a bad cell list, wherein a cell in the bad cell list is a cell to which the terminal device is forbidden to attach.

5. The device according to claim 4, wherein the processor is further configured to delete the first cell from the bad cell list after the terminal device is powered off or restarted, or after a preset period of time.

6. A terminal device, comprising a memory, a processor, and a transceiver, wherein
    the transceiver is configured to send a first capability report message when the terminal device requests to attach to a first cell, wherein the first capability report message indicates a frequency band support capability and a carrier aggregation capability of the terminal device;
    when the processor determines that a first reconfiguration request message is received for N consecutive times and all reconfigurations fail, the transceiver is further configured to send a detach request message and complete detaching from the first cell, wherein the first reconfiguration request message is used to indicate, to the terminal device, a frequency of a secondary cell in which carrier aggregation is performed, and N is a positive integer; and
    the transceiver is further configured to send a second capability report message when the terminal device re-requests to attach to the first cell, wherein carrier aggregation capabilities of the terminal device are disabled in the second capability report message, and the carrier aggregation capabilities of the terminal device are in all combinations comprising a frequency band in which the frequency of the secondary cell is located.

7. The device according to claim 6, wherein when the processor determines that a second reconfiguration request message is received for M consecutive times and all reconfigurations fail, the transceiver is further configured to send the detach request message and complete detaching from the first cell, wherein the second reconfiguration request message is used to indicate, to the terminal device, the frequency of the secondary cell in which carrier aggregation is performed or a frequency of a cell to which the terminal device is handed over, and M is a positive integer; and
the transceiver is further configured to send a third capability report message when the terminal device requests to attach to a second cell, wherein the second cell is different from the first cell, and the third capability report message indicates the frequency band support capability of the terminal device.

8. The device according to claim 7, wherein the processor is further configured to add the first cell to a bad cell list, wherein a cell in the bad cell list is a cell to which the terminal device is forbidden to attach.

9. The device according to claim 8, wherein the processor is further configured to delete the first cell from the bad cell list after the terminal device is powered off or restarted, or after a preset period of time.

10. A reconfiguration method, wherein the method comprises:
sending, by a terminal device, a first capability report message when requesting to attach to a first cell, wherein the first capability report message indicates a frequency band support capability and a carrier aggregation capability of the terminal device;
when a first reconfiguration request message is received for N consecutive times and all reconfigurations fail, sending, by the terminal device, a detach request message and completing detaching from the first cell, wherein the first reconfiguration request message is used to indicate, to the terminal device, a frequency of a secondary cell in which carrier aggregation is performed, and N is a positive integer; and
sending, by the terminal device, a second capability report message when re-requesting to attach to the first cell, wherein a first carrier aggregation capability of the terminal device is disabled in the second capability report message, and the first carrier aggregation capability comprises the carrier aggregation capability of the terminal device in a combination of a frequency band of the first cell and a frequency band in which the frequency of the secondary cell is located.

11. The method according to claim 10, wherein after the sending a second capability report message, the method further comprises:
when a second reconfiguration request message is received for M consecutive times and all reconfigurations fail, sending, by the terminal device, the detach request message and completing detaching from the first cell, wherein the second reconfiguration request message is used to indicate, to the terminal device, the frequency of the secondary cell in which the carrier aggregation is performed, and M is a positive integer; and
sending, by the terminal device, a third capability report message when re-requesting to attach to the first cell, wherein the carrier aggregation capabilities of the terminal device in all bands are disabled in the third capability report message.

12. The method according to claim 10, wherein after the sending a second capability report message, the method further comprises:
when a third reconfiguration request message is received for L consecutive times and all reconfigurations fail, sending, by the terminal device, the detach request message and completing detaching from the first cell, wherein the third reconfiguration request message is used to indicate, to the terminal device, the frequency of the secondary cell in which the carrier aggregation is performed or a frequency of a cell to which the terminal device is handed over, and L is a positive integer; and
sending, by the terminal device, a fourth capability report message when requesting to attach to a second cell, wherein the second cell is different from the first cell, and the fourth capability report message indicates the frequency band support capability of the terminal device.

13. The method according to claim 12, wherein the method further comprises:
adding, by the terminal device, the first cell to a bad cell list, wherein a cell in the bad cell list is a cell to which the terminal device is forbidden to attach.

14. The method according to claim 13, wherein after the adding, by the terminal device, the first cell to a bad cell list, the method further comprises:
deleting, by the terminal device, the first cell from the bad cell list after the terminal device is powered off or restarted or after a preset period of time.

15. A reconfiguration method, wherein the method comprises:
sending, by a terminal device, a first capability report message when requesting to attach to a first cell, wherein the first capability report message indicates a frequency band support capability and a carrier aggregation capability of the terminal device;
when a first reconfiguration request message is received for N consecutive times and all reconfigurations fail, sending, by the terminal device, a detach request message and completing detaching from the first cell, wherein the first reconfiguration request message is used to indicate, to the terminal device, a frequency of a secondary cell in which carrier aggregation is performed, and N is a positive integer; and
sending, by the terminal device, a second capability report message when re-requesting to attach to the first cell, wherein carrier aggregation capabilities of the terminal device in all bands are disabled in the second capability report message, and the carrier aggregation capabilities of the terminal device are in all combinations comprising a frequency band in which the frequency of the secondary cell is located.

16. The method according to claim 15, wherein the method further comprises:
when a second reconfiguration request message is received for M consecutive times and all reconfigurations fail, sending, by the terminal device, the detach request message and completing detaching from the first cell, wherein the second reconfiguration request message is used to indicate, to the terminal device, the frequency of the secondary cell in which carrier aggregation is performed or a frequency of a cell to which the terminal device is handed over, and M is a positive integer; and sending, by the terminal device, a third capability report message when requesting to attach to a second cell, wherein the second cell is different from the first cell, and the third capability report message indicates the frequency band support capability of the terminal device.

17. The method according to claim 16, wherein the method further comprises:
adding, by the terminal device, the first cell to a bad cell list, wherein a cell in the bad cell list is a cell to which the terminal device is forbidden to attach.

18. The method according to claim 17, wherein after the adding, by the terminal device, the first cell to a bad cell list, the method further comprises:
deleting, by the terminal device, the first cell from the bad cell list after the terminal device is powered off or restarted or after a preset period of time.

* * * * *